(12) United States Patent
Okanaka et al.

(10) Patent No.: US 7,354,031 B2
(45) Date of Patent: Apr. 8, 2008

(54) CYLINDRICAL VIBRATION DAMPING APPARATUS AND METHOD OF MANUFACTURING THE SAME

(75) Inventors: Takehiro Okanaka, Kasugai (JP); Fumiaki Hashimoto, Kounan (JP)

(73) Assignee: Tokai Rubber Industries, Ltd., Komaki (JP)

( * ) Notice: Subject to any disclaimer, the term of this patent is extended or adjusted under 35 U.S.C. 154(b) by 275 days.

(21) Appl. No.: 11/049,733

(22) Filed: Feb. 4, 2005

(65) Prior Publication Data

US 2005/0179181 A1    Aug. 18, 2005

(30) Foreign Application Priority Data

Feb. 17, 2004 (JP) ............................ 2004-040478
Nov. 30, 2004 (JP) ............................ 2004-347320

(51) Int. Cl.
F16F 5/00 (2006.01)

(52) U.S. Cl. ............................ 267/140.12; 267/141.3

(58) Field of Classification Search .......... 267/140.12, 267/141.2, 141.3, 293
See application file for complete search history.

(56) References Cited

U.S. PATENT DOCUMENTS 4,848,756 A * 7/1989 Funahashi et al. ..... 267/140.12
5,769,399 A * 6/1998 Fiedler ................... 267/140.11
5,992,816 A * 11/1999 Yoshida et al. ............ 248/638
6,116,587 A * 9/2000 Miyahara ............... 267/140.12
6,450,486 B1 * 9/2002 Satori et al. ........... 267/140.12

FOREIGN PATENT DOCUMENTS

| JP | A 05-118367 | | 5/1993 |
| JP | 11082607 A | * | 3/1999 |
| JP | A 11-125289 | | 5/1999 |
| JP | A 2000-205323 | | 7/2000 |

* cited by examiner

Primary Examiner—Bradley King
(74) Attorney, Agent, or Firm—Oliff & Berridge, PLC

(57) ABSTRACT

A cylindrical vibration damping apparatus having an elastic body connecting an inner shaft and an outer cylinder member, and a pair of rubber stop plates disposed at axial ends of the inner shaft member. Each rubber stop plate has a mount hole that fits about the outside of the inner shaft member. Pairs of mating projections and mating recesses are provided to an interface between an inner circumferential surface of the mount hole of the each rubber stop plate and an outer circumferential surface of the corresponding axial end of the inner shaft member at three or more different intervals in a circumferential direction so that the pair of rubber stop plates are installed onto the axial ends of the inner shaft member with correct identification of a front and back and a circumferential position about the inner shaft member. A method of manufacturing the same is also disclosed.

12 Claims, 20 Drawing Sheets

CYLINDRICAL VIBRATION DAMPING APPARATUS AND METHOD OF MANUFACTURING THE SAME

INCORPORATED BY REFERENCE

The disclosure of Japanese Patent Application No. 2004-040478 filed on Feb. 17, 2004 and No. 2004-347320 fined on Nov. 30, 2004, each including the specification, drawings and abstract is incorporated herein by reference in its entirety.

BACKGROUND OF THE INVENTION

1. Field of the Invention

The present invention relates to a cylindrical vibration damping apparatus favorable for use as an automotive engine mount or torque roll mount, for example, and more particular to a cylindrical vibration damping apparatus equipped with a rubber stop plate constituting a stopper mechanism in the axial direction.

2. Description of the Related Art

As one type of vibration damping apparatus known in the art for installation between parts that make up a vibration transmitting system, there is known a cylindrical vibration damping apparatus comprising a vibration damping unit of cylindrical shape, having a metallic outer cylindrical member disposed spaced apart to the outside of a metallic inner shaft member, with the inner shaft member and the outer cylindrical member being connected by means of a rubber elastic body. Cylindrical vibration damping apparatus of this kind are used, for example, as automotive engine mounts or torque roll mounts.

Cylindrical vibration damping apparatus of this kind are often equipped with a stopper mechanism in the axial direction, for cushion-wise restriction of relative axial displacement of the inner shaft member and the outer cylindrical member when large load is input in the axial direction. Such an axial stopper mechanism may be realized in the manner taught in Citation 1 or Citation 2 for example, by installing a pair of rubber stop plates that spread out in the axis-perpendicular direction, disposed at the two axial ends of the inner shaft member in the cylindrical vibration damping unit. Specifically, with the cylindrical vibration damping apparatus mounted onto an automobile, the two axial end faces of the outer cylindrical member, with the rubber stop plates sandwiched between, are positioned in axial opposition to brackets or other contact members affixed to the axial ends of the inner shaft member, and the outer cylindrical member is placed in abutment via the rubber stop plates with the contact members affixed to the inner shaft member, whereby cushion-wise stopper functionality in the axial direction is achieved.

The rubber stop plate installed in such a cylindrical vibration damping unit typically has a generally flat plate shape, provided in the center portion thereof with a mount hole that fits about the outside of the inner shaft member. However, it does not necessarily have the simple flat disk-shaped rotating body shape taught in the aforementioned Citations 1 and 2. Specifically, as taught in Citaton 3, in many instances, due to considerations such as for reasons of interference with brackets or other components or installation space, or of the extent of relative displacement of the inner shaft member and the outer cylindrical member in the axis-perpendicular direction produced by loaded weight exerted on them in the installed state, the rubber stop plate is given varying diameter dimension in the circumferential direction around the inner shaft member. Also, in many instances a rubber stop plate is designed such that one face thereof is supported superposed hermetically over the entire face thereof against the bracket or other contact fitting, while the other face thereof has formed thereon an elastic projection that projects in an appropriate size and shape, thereby providing stable support while at the same time adjusting the cushioning function at the time of contact so as to achieve non-linear spring characteristics.

That is, with rubber stop plates of this kind, during installation onto the cylindrical vibration damping unit, it is necessary to carry out the installation procedure in an error-free manner, while (1) not only identifying the correct position in the circumferential direction thereof, but also (2) identifying the front and back thereof. In the event of improper installation, it will be necessary after inspection to remove and then reinstall the rubber stop plate. In view of recent deliberations regarding shipping components with the bracket attached, in the event that the rubber stop plate were found to be improperly installed during inspection after the bracket has been attached, it would be necessary to remove the bracket in order to perform the repair operation, resulting in the significant problem of a considerable amount of extra labor.

However, in the cylindrical vibration damping apparatus of conventional design taught in Citatons 1 and 2, there are employed no arrangements that require identifying either the circumferential position or the front from the back of the rubber stop plate during installation. With the cylindrical vibration damping apparatus of conventional design taught in Citaton 3, in order to be able to identify the installation position of the rubber stop plate, a single indented mating portion is formed at one location along the circumference. However, it is not possible thereby to distinguish the front and back of the rubber stop plate, so that there remains a likelihood of drawbacks stemming from improper installation.

[Citation 1] JP-A-2000-205323
[Citation 2] JP-A-5-118367
[Citation 3] JP-A-11-125289

SUMMARY OF THE INVENTION

It is therefore one object of this invention to provide a cylindrical vibration damping apparatus of novel construction that is capable of carrying out the installation of a right and left pair of rubber stop plates in an error-free manner, while identifying the correct position in the circumferential direction of each plate, and identifying the front and back of each plate, thereby eliminating drawbacks stemming from improper installation. Another object of the invention is to provide a novel method of manufacturing the cylindrical vibration damping apparatus.

The above and/or optional objects of this invention may be attained according to at least one of the following modes of the invention. Each element defined in any one of the following preferred modes of the invention may be adopted at any possible optional combinations. It is to be understood that the present invention is not limited to the following forms or combinations of these forms, but may otherwise be recognized based on the thought of the present invention that described in the whole specification and drawings or that may be recognized by those skilled in the art in the light of the disclosure in the whole specification and drawings.

A first aspect of the present invention provides a cylindrical vibration damping apparatus comprising: an inner shaft member; an outer cylinder member disposed spaced apart to an outside of the inner shaft member; a rubber elastic body disposed between and elastically connecting the inner shaft member and the outer cylinder member; and a pair of rubber stop plates disposed at two axial ends of the inner shaft member, each rubber stop plate having a mount hole that fits about the outside of the inner shaft member to be assembled with a corresponding axial end of the inner shaft member, wherein pairs of mating projections and mating recesses are provided to an interface between an inner circumferential surface of the mount hole of the each rubber stop plate and an outer circumferential surface of the corresponding axial end of the inner shaft member at three or more different intervals in a circumferential direction so that the pair of rubber stop plates are installed onto the axial ends of the inner shaft member, while correctly identifying a front and back and a circumferential position about the inner shaft member.

In the cylindrical vibration damping apparatus of construction according to the invention, by only employing a considerably simple structure, namely by only forming at least tree pairs of mating projections and recesses pairs onto the inner circumferential surface of the mount hole of each rubber stop plate and the outer circumferential surface of the corresponding axial end of the inner shaft member, it is possible to install the pair of rubber stop plates onto the ends of the inner shaft member while not only identifying the correct position in the circumferential direction thereof, but also identifying the front and back thereof. Thus, drawbacks stemming from improper installation of the rubber stop plates can be substantially completely prevented.

Specifically, in the present invention, the mating projections and mating recesses in the rubber stop plate and the inner shaft member are disposed at three or more locations in the circumferential direction, and at three or more different intervals in the circumferential direction. Therefore, during installation of a given pair of rubber stop plates at the ends of the inner shaft member, if the circumferential position of the rubber stop plate is not correct or if front and back have been reversed, it will not be possible to install the rubber stop plate onto the inner shaft member.

Thus, even in instances where rubber stop plates are installed on cylindrical vibration damping units manually by means of a manual operation, it will be possible for the operator to carry out the procedure while correctly identifying the front and back and the circumferential position, without having to take especial care, thereby considerably reducing the burden placed on the operator.

In one preferred form of the present invention, the each rubber stop plate has an integrally formed elastic projection projecting out from one face thereof, and with the rubber stop plate installed on the vibration damping apparatus, the elastic projection projects axially inward and positioned in opposition to a corresponding axial end face of the outer cylindrical member. This arrangement can provide a greater degree of freedom in terms of design of stopper functionality (e.g. non-linear characteristics) by means of the elastic projection. In particular, according to the present invention, not only the circumferential position of the rubber stop plate but also its front and back faces may be identified accurately during installation of the rubber stop plate, whereby even where an elastic projection has been provided, contact location and contact condition on the part of the elastic projection are consistently assured, so that the desired stopper functionality is consistently achieved.

In another preferred form of the invention, spring characteristics in an axis-perpendicular direction of the vibration damping apparatus (i.e., a direction perpendicular to an axial direction of the apparatus) vary along the circumferential direction, and the mating protrusions or recesses formed onto the outer circumferential surface of the inner shaft member identify a circumferential location with respect to the axis-perpendicular direction in which a specific spring characteristic is exhibited. By employing such an arrangement, where the rubber stop plate is to be installed on a vibration damping apparatus of a structure wherein, for example, a lightening hole, slit or the like has been formed or an axis-perpendicular stopper mechanism has been constructed to produce axis-perpendicular spring characteristics that vary in the circumferential direction, it will be possible to nevertheless establish the correct position in the circumferential direction for installing the rubber stop plate with respect to the axis-perpendicular direction in which the specific spring characteristic is exhibited.

In yet another preferred form of the invention, the vibration damping apparatus with the pair of rubber stop plates installed, further comprises: an outer bracket of cylindrical shape having fastener legs is pre-attached fitting onto the outside of the outer cylindrical member; and a differentiating member enabling differentiation of axial direction. By employing the differentiating member, it becomes possible when installing the outer bracket onto a cylindrical vibration-damping apparatus to identify in the axial direction the installation direction of the vibration damping apparatus with respect to the outer bracket. Therefore, even in instances where the installation direction of the outer bracket with respect to the vibration damping unit is specified in the circumferential direction by means of the direction of the fastener legs etc., it will be possible nevertheless to install it correctly not only in terms of the circumferential attachment location of the rubber stop plate to the cylindrical vibration damping unit, but also in terms of the circumferential attachment location with respect to the outer bracket.

The axial direction differentiating member favorably employed in the invention may be composed of any of the differentiating mechanisms of various kinds known in the art. For instance, employed is a mechanism whereby a differentiating projection that projects in a first axial direction with respect to the rubber elastic body making up the cylindrical vibration damping unit is formed. This differentiating projection is detected by means of an infrared sensor or the like in order to differentiate the axial direction. Alternatively employed are a mechanism whereby, for example, a notch is formed in the rim of the mouth at a first axial end in the outer cylindrical member, this notch being detected by means of an infrared sensor or the like in order to differentiate the axial direction, or a mechanism whereby identifying indicia is painted onto a first axial end of the cylindrical vibration damping unit, and the identifying indicia is identified by means of image processing using a CCD camera.

In further preferred form of the invention wherein the vibration damping apparatus is installed with the pair of rubber stop plates, contact members that extend in an axis-perpendicular direction are attached superposed onto the axial ends of the inner shaft member, with the rubber stop plates superposed against the contact members. In the cylindrical vibration damping apparatus having such an arrangement, the contact member may be composed, for example, of an inner bracket for attaching the inner shaft member to one of the vibration-linked members. Here, even in instances where the attachment direction of the inner braked to the inner shaft member is specified in the circumferential direction, since the rubber stop plate per se is installed onto the inner shaft member at a specified location in the circumferential direction, it can be consistently positioned at the predetermined location and set between the cylindrical vibration damping unit and the contact member.

More preferably, the pair of contact members disposed at the axial ends of the inner shaft member are linked together by means of a linking portion the extends in the axial direction on the outside periphery of the outer cylindrical member, to constitute the inner bracket. By employing this kind of inner bracket, the contact members at the axial ends can be constructed efficiently, and the left and right contact members given a unitary structure, whereby the contact member attachment locations to the cylindrical vibration apparatus can be established more consistently.

In yet further preferred form of the invention, the cylindrical vibration damping apparatus further comprising: a lightening portion formed passing through around the inner shaft member in the axial direction in the rubber elastic body, with at least one of the mating protrusions being formed on the outer circumferential surface of each of the axial ends of the inner shaft member at a circumferential location corresponding to the lightening portion, the mating protrusion having an axis-perpendicular extension dimension restricted by the lightening portion so as to be smaller than other mating protrusions; a secondary protrusion formed on the outer circumferential surface of each of the axial ends of the inner shaft member at a location away from the area where the lightening portion is formed; and a secondary recess formed on the inner circumferential surface of the mount hole of the corresponding rubber stop plate, at a location corresponding to the secondary protrusion, wherein with the mating protrusions and mating recesses in a mated state, the secondary protrusion engages in the secondary recess.

In the cylindrical vibration damping apparatus having such an arrangement, when integrally forming a mating protrusions with the rubber elastic body having a lightening portion for example, by limiting the extension dimension in the axis-perpendicular direction of the mating protrusion that has been positioned in the area where the lightening portion is formed, an sufficient free surface area of the lightening portion is assured. Thus, where the invention is implemented in a fluid-filled type cylindrical vibration damping apparatus wherein a portion of the wall of the fluid chamber is constituted by a lightening portion as taught in JP-A-11-125289 for example, ample capacity of the fluid chamber is assured on the basis of assuring free surface area of the lightening portion, whereby the desired damping effect can be achieved consistently based on flow action of the fluid filling the fluid chamber. Also, where the axis-perpendicular spring characteristics of the rubber elastic body have been modified by means of the lightening portion, tuning is modifiable with a high degree of freedom. That is, by employing the arrangement described above, improper installation of rubber stop plates may be advantageously prevented, even where the vibration damping apparatus comprises a lightening portion.

Also, with the arrangement described previously, the secondary protrusion is formed at a location away from the area where the lightening is formed on the outside peripheral face at the axial end of the inner shaft member, and mates with the secondary recess formed on the inside peripheral face of the mount hole of the rubber stop plate, thereby assuring ample free surface area of the lightening portion while advantageously preventing relative rotation of the inner shaft member and the rubber stop plate, providing an additional level of stabilization of the attachment location of the rubber stop plate.

In a still further preferred form of the invention, there will be employed an arrangement wherein the lightening portion is formed extending along the circumferential direction over a generally half-circumferential portion around the inner shaft member in the rubber elastic body, and a stopper portion that projects towards the outer cylindrical member from the inner shaft member is formed between axis-perpendicular opposed faces of a circumferentially medial portion of the lightening portion and the inner shaft member. In the cylindrical vibration damping apparatus of this arrangement, there is effectively assured a location at which the area where the lightening is formed at the outside peripheral face of the inner shaft member in the direction in which the stopper member projects, and as a result there is a greater degree of freedom in design modification of the secondary protrusion, and prevention of improper installation is prevented more thoroughly.

In a yet further preferred form of the invention, the cylindrical vibration damping apparatus further comprises: a pressure receiving chamber having a non-compressible fluid sealed therein and formed in a generally half-circumferential portion to one side of the inner shaft member in a first axis-perpendicular direction, and located inside the rubber elastic body that provides direct elastic connection between the inner shaft member and the outer cylindrical member; and an equilibrium chamber having the non-compressible fluid sealed therein and formed in a generally half-circumferential portion to an other side of the inner shaft member where the lightening portion is formed, and located inside the rubber elastic body that is situated to an outside periphery of the lightening portion so as to substantially avoids stress transmission from the inner shaft member. By employing the present invention, even in a fluid-filled type cylindrical vibration damping apparatus having a pressure receiving chamber and equilibrium chamber like those described above, it will nevertheless be possible to install the rubber stop plates in the vibration damping unit while correctly identifying the circumferential position and front/back thereof.

In the present invention, preferably, there will be employed an arrangement wherein the mating recesses and mating protrusions are formed as three pairs having relative positional relationships of 90±10°, 120±10°, and 150±10° in the circumferential direction. With a cylindrical vibration damping apparatus of such an arrangement, a relatively large distance is established separating the mating recesses or mating protrusions in the circumferential direction at the outer peripheral face of the inner shaft member and the inner peripheral face of the mount hole of the rubber stop plate. As a result, it is possible to favorably reduce or eliminate problems such as susceptibility to improper installation caused by forceful mating of mating recesses or mating protrusions at the wrong location, due to the small distances separating adjacent mating recesses or mating protrusions.

A second aspect of the present invention provides a method of manufacturing a cylindrical vibration damping apparatus, comprising the steps of: (a) preparing a cylindrical vibration damping unit by disposing an outer cylindrical member spaced apart to an outside of an inner shaft member, and connecting the inner shaft member and the outer cylindrical member by means of a rubber elastic body, while providing mating projections or mating recesses on outer circumferential surfaces of two axial ends of the inner shaft member at three or more different intervals in a circumferential direction; (b) while identifying axial direction of the vibration damping unit, press fitting the outer cylindrical member of the vibration damping unit into a cylindrical outer bracket having fastener legs, to attach the outer bracket to the vibration damping unit; (c) preparing a pair of rubber stop plates each having generally flat plate shape and having a mount hole formed in a center portion, there being formed on an inner circumferential surface of the mount hole mating protrusions or mating recesses at a location on the circumference corresponding to the mating recess or mating protrusion formed on the outer circumferential surface of a corresponding axial end of the inner shaft member; and (d) installing the pair of rubber stop plates with the mount holes thereof fitting onto the two axial ends of the inner shaft member in the vibration damping unit to which the outer bracket has been attached, and mating the mating protrusions or mating recesses of each of the rubber stop plates with the mating recesses or mating protrusions on the inner shaft member, in order to attach the pair of rubber stop plates to the inner shaft member while identifying the front and back thereof and while identifying the circumferential direction position around the inner shaft member.

According to the method of the present invention, it is possible to attach a pair of rubber stop plates to a vibration damping unit while correctly identifying the front/back and circumferential position thereof, so that even in instances where rubber stop plates are installed by means of a manual operation, it will be possible to considerably reduce the burden of labor, including constant attention, required of the operator, so that problems resulting from improper installation, such as those discussed previously, are effectively resolved, and so that is it possible to achieve excellent production efficiency.

Preferably, the method of the present invention further comprises, in the step of attaching the outer bracket to the vibration damping unit, steps of: aligning the vibration damping unit relative to the outer bracket; and then press fitting the vibration damping unit into the outer bracket. Here, more preferably, in the event that a lightening hole or slit is formed over a portion of the circumference in order to adjust spring characteristics in the rubber elastic body, this lightening hole or slit will be utilized to position the vibration damping unit in the circumferential direction, while press fitting it into the outer bracket which has been set at a specific circumferential position.

As will be apparent from the description hereinabove, according to the cylindrical vibration damping apparatus constructed in accordance with the invention and the cylindrical vibration damping apparatus manufacturing method in accordance with the invention, the use of an extremely simple arrangement, namely, forming three or more mating recesses/protrusions on the outer circumferential surfaces of the two ends of the inner shaft member and on the inner circumferential surfaces of mount holes in a pair of rubber stop plates, makes it possible to attach the pair rubber stop plates to the cylindrical vibration damping unit while correctly identifying the front/back and circumferential position thereof. Accordingly, according to the present invention, problems resulting from improper installation of the pair of rubber stop plates onto the cylindrical vibration damping unit, such as those discussed previously, can be effectively resolved; and cylindrical vibration damping units having rubber stop plates installed properly thereon can be provided consistently, and with excellent production efficiency.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
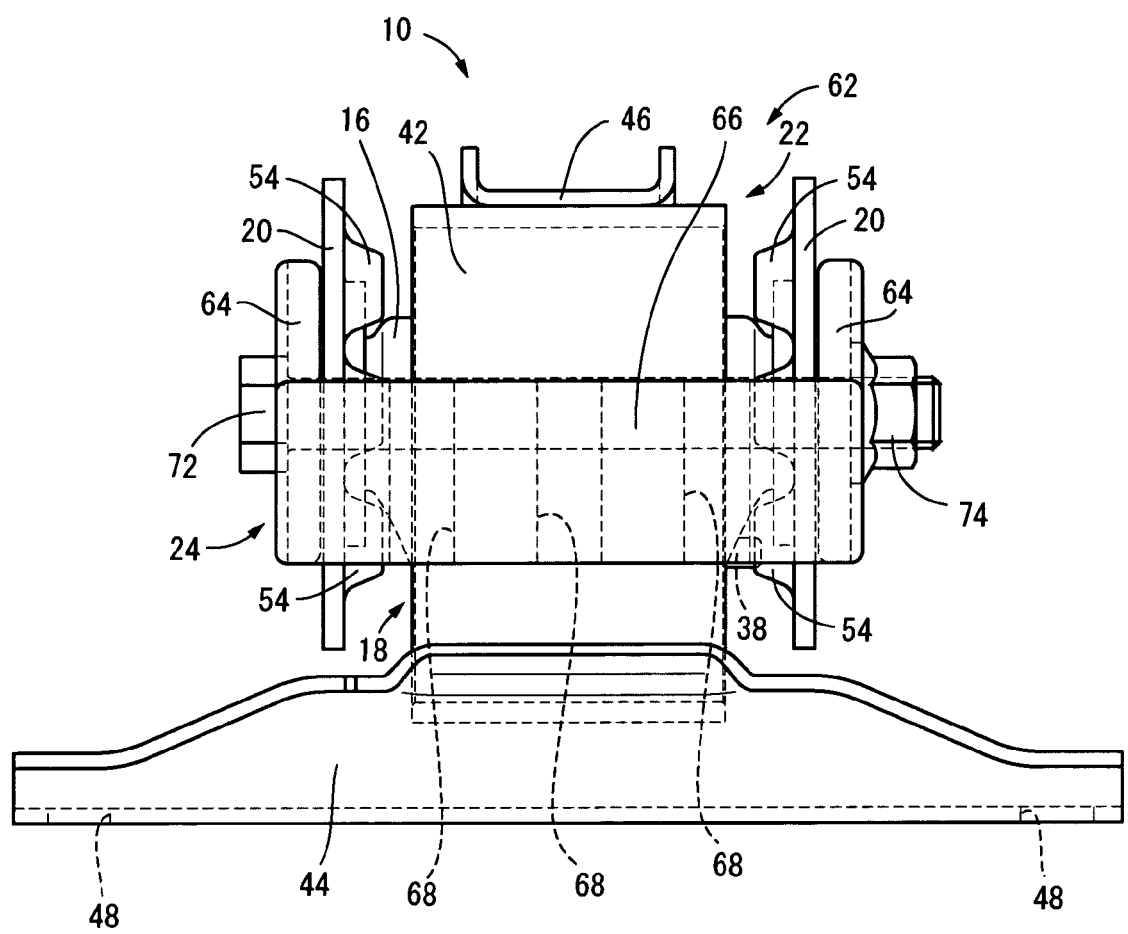
FIG. 1 is a front elevational view of a torque roll mount of construction according to a first embodiment of the present invention.
Figure 2:
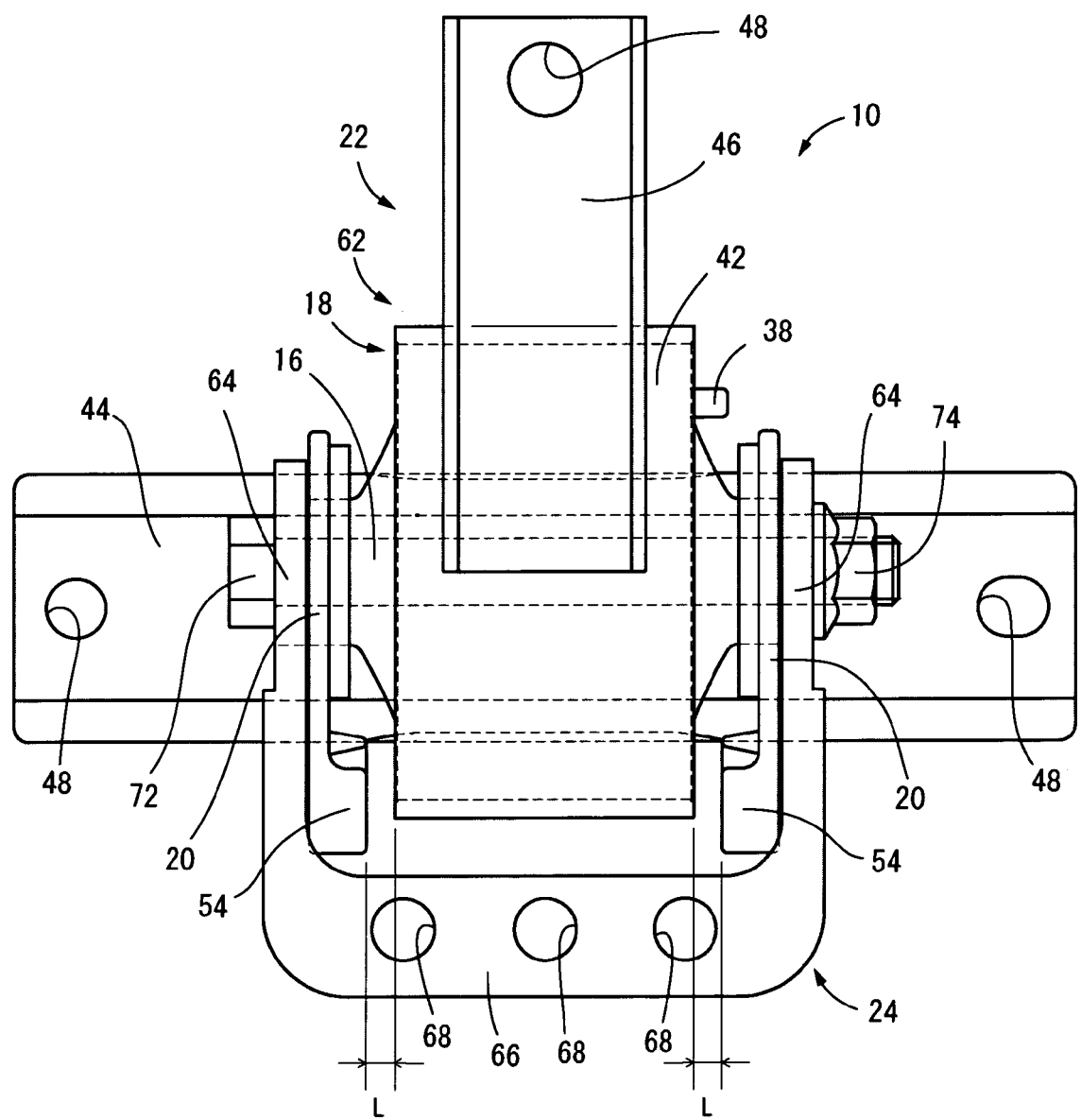
FIG. 2 is a top plane view of the torque roll mount of FIG. 1.
Figure 3:
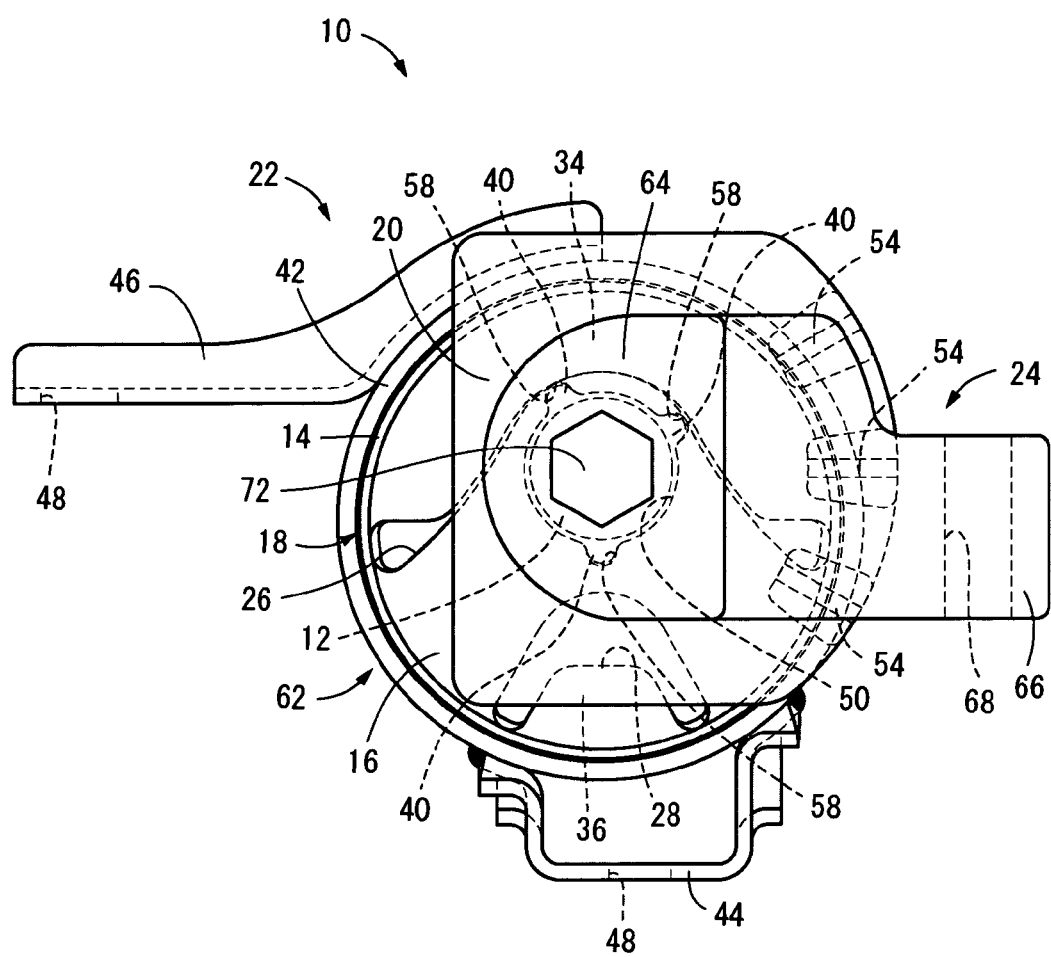
FIG. 3 is a left-side elevational view of the torque roll mount of FIG. 1.

Referring first to FIGS. 1-3, there is shown by way of a first embodiment of a cylindrical vibration damping apparatus of the invention, i.e., a torque roll mount 10, which is shown as-shipped from the factory. The torque roll mount 10 comprises a mount body 18 which is a cylindrical vibration damping unit having a structure in which an inner shaft member in the form of a metallic inner sleeve 12 and an outer cylindrical member in the form of a metallic outer sleeve 14, are elastically connected by means of a rubber elastic body 16. A pair of rubber stop plates 20, 20 are attached to the mount body 18, at the two axial sides thereof (hereinafter also referred to as the left and right sides). Also, an outer bracket 22 is attached to the outer sleeve 14 and an inner bracket 24 is attached to the inner sleeve 12.

The torque roll mount 10, oriented with its generally plumb vertical direction coincident with the vertical direction in FIGS. 1 and 3 and the generally front-back direction of the vehicle coincident with the sideways direction in FIGS. 1 and 2, is installed on an automotive vehicle, with the outer sleeve 14 fixedly mounted to the vehicle body (not shown) via the outer bracket 22, and the inner sleeve 12 fixedly mounted to the power unit of the vehicle (not shown) via the inner bracket 24, whereby the torque roll mount 10 is installed thereby between the power unit and the vehicle body. In this installed condition, the distributed support load of the power unit is exerted across the inner sleeve 12 and the outer sleeve 14, whereby the rubber elastic body 16 undergoes a predetermined level of elastic deformation causing the inner and outer sleeves 12, 14 to undergo relative displacement by a predetermined level in the axis-perpendicular direction, so that the inner and outer sleeves 12, 14 are positioned in a generally concentric or coaxial condition.

Figure 4:
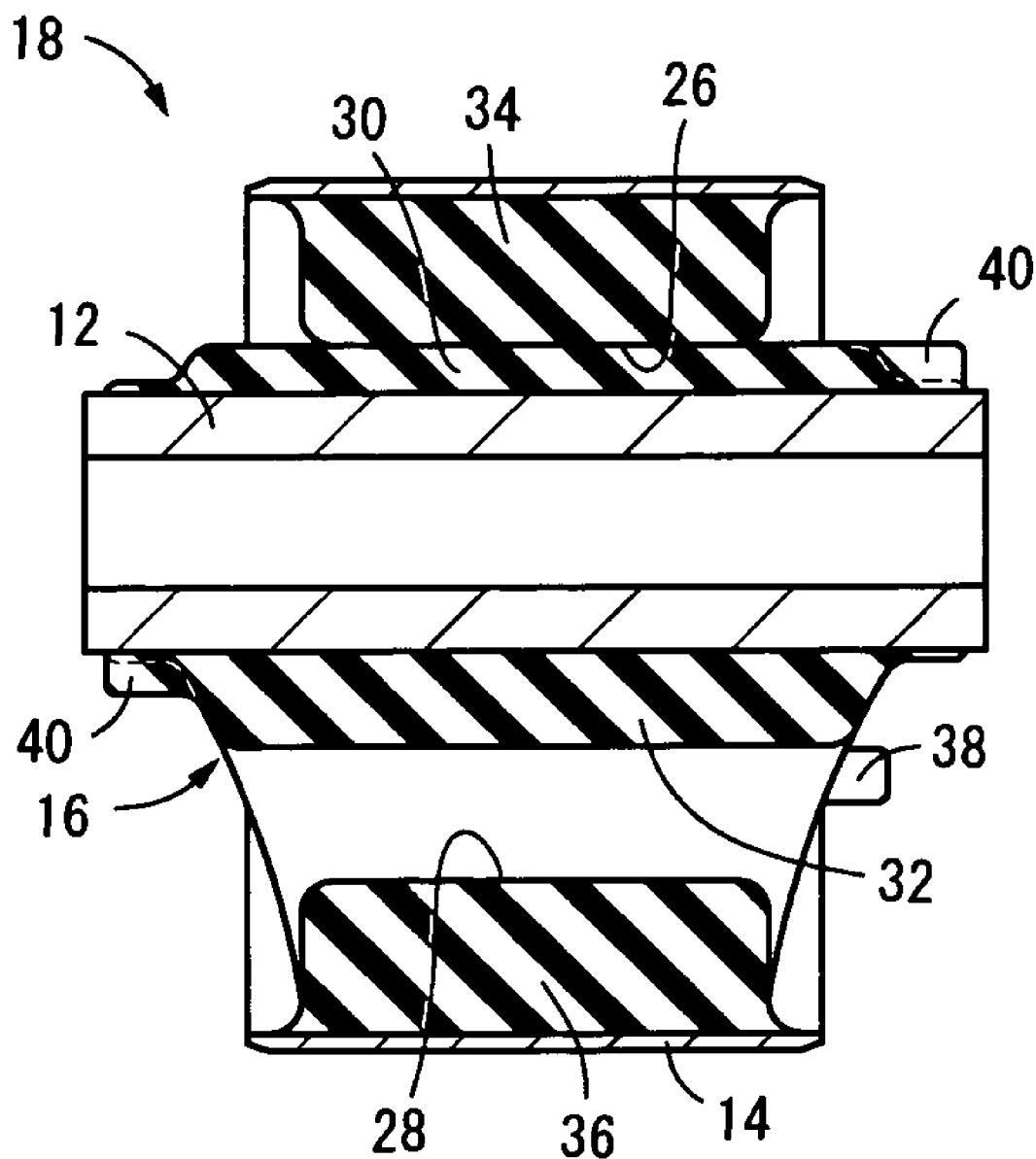
FIG. 4 is an axial cross sectional view of a mount unit of the torque roll mount of FIG. 1.
Figure 5:
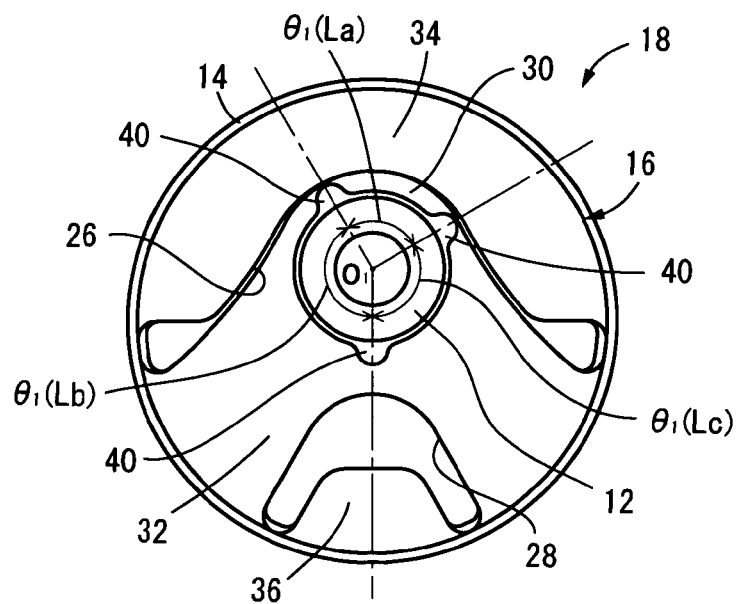
FIG. 5 is a left-side elevational view of the mount unit of FIG. 4.
Figure 6:
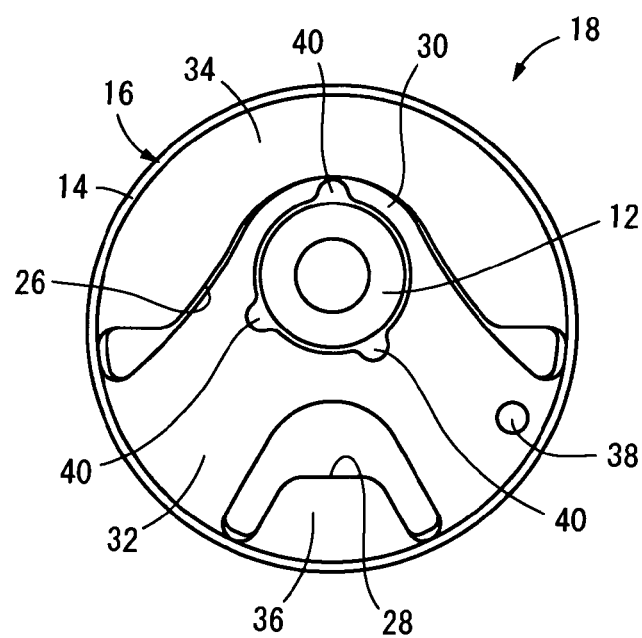
FIG. 6 is a right-side elevational view of the mount unit of FIG. 4.

Described more specifically, as shown in FIGS. 4-6, the mount body 18 is composed of an integral vulcanization molded product of the rubber elastic body 16. Specifically, the inner sleeve 12 has a small-diameter, thick-walled cylindrical shape, and the outer sleeve 14 has a large-diameter, thin-walled cylindrical shape. In consideration of the static distributed support load in exerted in the installed state, the inner and outer sleeves 12, 14 are pre-positioned eccentric by a predetermined extent, on the opposite side from the input direction of distributed support load.

Between the diametrically opposite faces of the inner sleeve 12 and outer sleeve 14 there is interposed the rubber elastic body 16 which has a thick-walled cylindrical shape overall. The outside peripheral face of the inner sleeve 12 is bonded by vulcanization to the inside peripheral face of the rubber elastic body 16, and the outside peripheral face of the rubber elastic body 16 is bonded by vulcanization to the inside peripheral face of the outer sleeve 14.

On the rubber elastic body 16 there are formed an upper slit 26 and a lower slit 28 positioned to the upper and lower sides of a first direction in the diametrical direction of the inner sleeve 12 which is the direction of eccentricity thereof, with each slit penetrating through in the axial direction. The upper and lower slits 26, 28 each have an axial end face shape that approximates an inverted V shape as shown in FIG. 5, whereby the rubber elastic body 16 which links together the inner sleeve 12 and the outer sleeve 14 is imparted with a transverse cross sectional shape comprising a pair of elastic linking portions 30, 32 that open upward in a generally inverted V shape from the inner sleeve 12 towards the outer sleeve 14. By providing such a pair of elastic linking portions 30, 32, the occurrence of tensile stress in the rubber elastic body 16 due to the distributed support load of the power unit exerted on it in the installed state can be reduced.

Additionally, in the installed state, the distributed support load of the power unit is exerted across the inner and outer sleeves 12, 14 causing the elastic linking portions 30, 32 to undergo elastic deformation, whereby the inner and outer sleeves 12, 14 are arranged in an approximately concentric fashion. In this state, at the diametrical upper and lower sides on either side of the inner sleeve 12 there are formed the upper and lower slits 26, 28 penetrating through in the axial direction by predetermined width. At the upper and lower sides on either side of these upper and lower slits 26, 28, there are formed upper and lower cushioning rubber stoppers 34, 36 which are formed by means of the rubber elastic body 16. That is, when a large load is exerted in the vertical direction across the inner and outer sleeves 12, 14, the inner sleeve 12 comes into contact with the outer sleeve 14 via the upper and lower cushioning rubber stoppers 34, 36, whereby the level of relative displacement of the inner and outer sleeves 12, 14 in the axis-perpendicular is restricted in a cushion wise manner.

The rubber elastic body 16 at one axial end face thereof has integrally formed a differentiating member in the form of a differentiating projection 38 which projected outwardly in the axial direction, serving as axis direction differentiating member. The differentiating projection 38 can be formed advantageously, for example, by utilizing the nozzle portion that injects the rubber material into the mold cavity during molding of the rubber elastic body 16. In this embodiment in particular, projection formation takes place at the end face of one of the elastic linking portions 32, in proximity to the outer sleeve 14 and neighboring the outside peripheral edge of the rubber elastic body 16, and projects outwardly a greater distance than the outer sleeve 14.

The two axial end portions of the inner sleeve 12 project out by a predetermined length from the two axial sides of the rubber elastic body 16. On the outer peripheral face of each projection portion are formed mating protrusions 40, 40, 40 situated at three or more locations (three in this embodiment) along the circumference on the outer peripheral face. In particular, in this embodiment, the three mating protrusions 40, 40, 40 extend in the axial direction with a generally uniform semi-circular cross-sectional shape to produce a "round-ridge" shape overall, integrally formed with the rubber elastic body 16. In this embodiment, the three mating protrusions 40, 40, 40 are formed with generally the same shape and size.

As shown in FIG. 5 and FIG. 6, the three mating protrusions 40, 40, 40 at the axial ends are positioned predetermined distances apart from one another in the circumferential direction of the inner sleeve 12. The three mating protrusions 40, 40, 40 are established at different relative distances: La, Lb, Lc apart from one another in the circumferential direction. In this embodiment in particular, in order that the three distances La, Lb, Lc are made as different from one another as possible, in preferred practice these will be established such that $\theta_1$ (La)=90±10° (=80-100°), $\theta_1$ (Lb) =150±10° (=140-160°), and $\theta_1$ (Lc)=120 ±10° (=110-130°), more preferably $\theta_1$ (La)≈90°, $\theta_1$ (Lb)≈150°, $\theta_1$ (Lc)≈120°. $\theta_1$ (La), $\theta_1$ (Lb) and $\theta_1$ (Lc) indicate the angles for establishing distances apart from one another in the circumferential direction of adjacent pairs of mating protrusions 40, 40.

Also, as shown in FIGS. 5 and 6, the three mating protrusions 40, 40, 40 are not positioned overlapping one another in an axial projection of the inner sleeve 12. Rather, when the two axial end face shapes are superimposed on one another, i.e. when FIG. 5, which is the left end face diagram in FIG. 4, and FIG. 6 which is a right end face diagram are superimposed on one another, the three mating protrusions 40, 40, 40 at the two end faces are formed on the basis of a positional relationship that is point-symmetrical about center point: $O_1$, which is the center axis of the inner sleeve 12.

Figure 7:
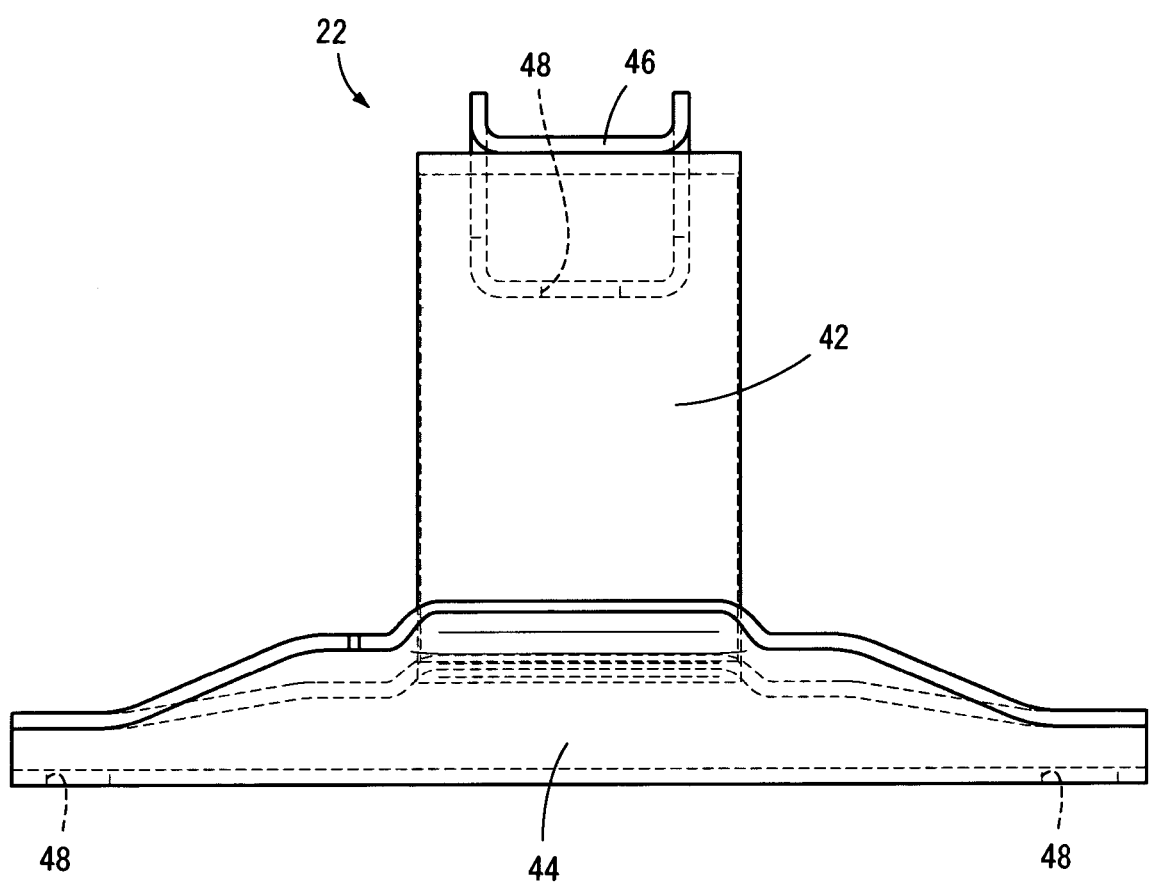
FIG. 7 is a front elevational view of an outer bracket of the torque roll mount of FIG. 1.
Figure 8:
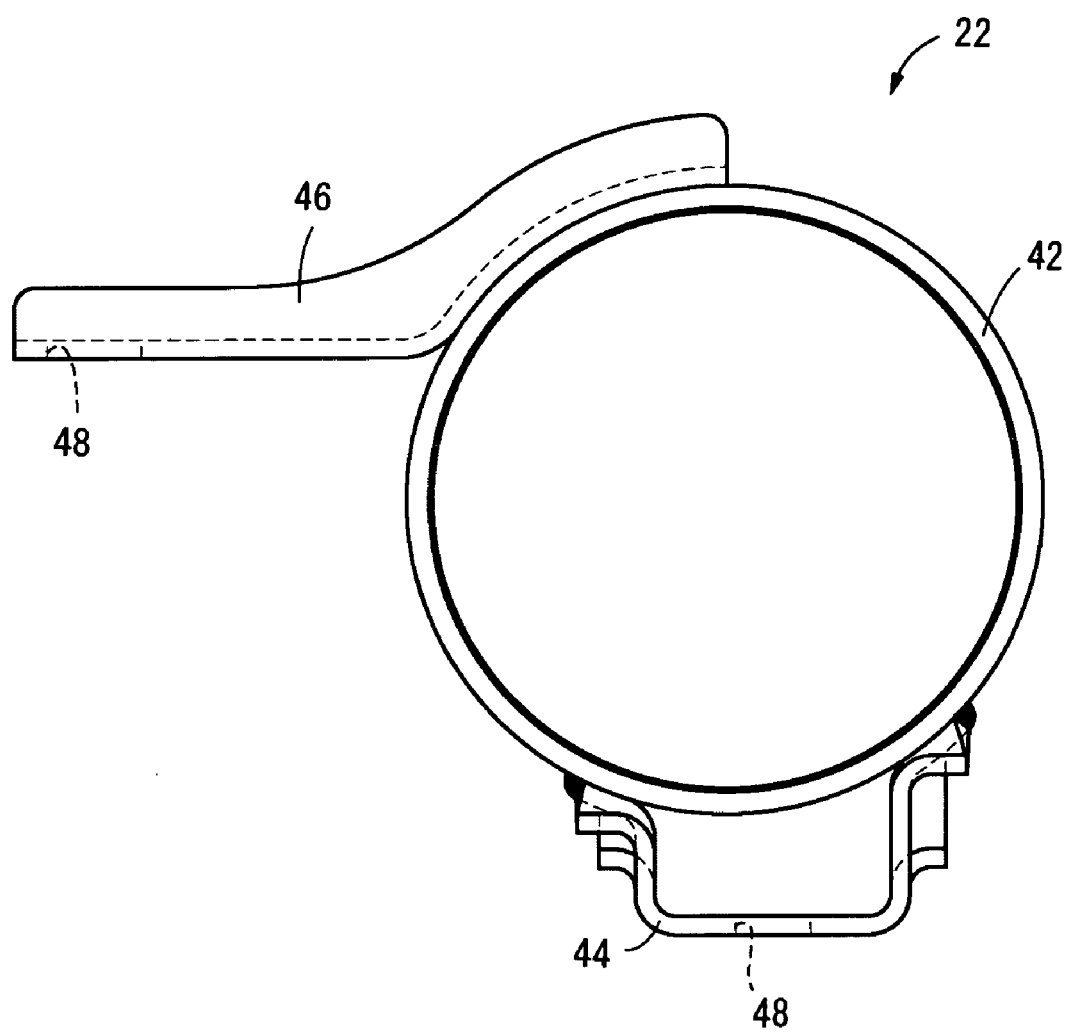
FIG. 8 is a left-side elevational view of the outer bracket of FIG. 7.

The mount body 18, which is an integral vulcanization molded product having this type of arrangement, is attached to the outer bracket as shown in FIGS. 7 and 8.

The outer bracket 22 has a structure in which a first fastener leg 44 and a second fastener leg 46 are respectively welded to and project out from the outside peripheral face of a fitting cylinder 42 of cylindrical shape. The first fastener leg 44 spreads out appreciably to either side in the axial direction on the outer peripheral face of the fitting cylinder 42 on the one hand, while the second fastener leg 46 spreads out appreciably outwardly in the axis-perpendicular direction on the outer peripheral face of the fitting cylinder 42. By means of a fastening bolt (not shown) passed through a fastening hole 48 provided in the first and second fastener legs 44, 46, the outer bracket 22 is fixedly mounted onto the vehicle body of the automobile.

Figure 9:
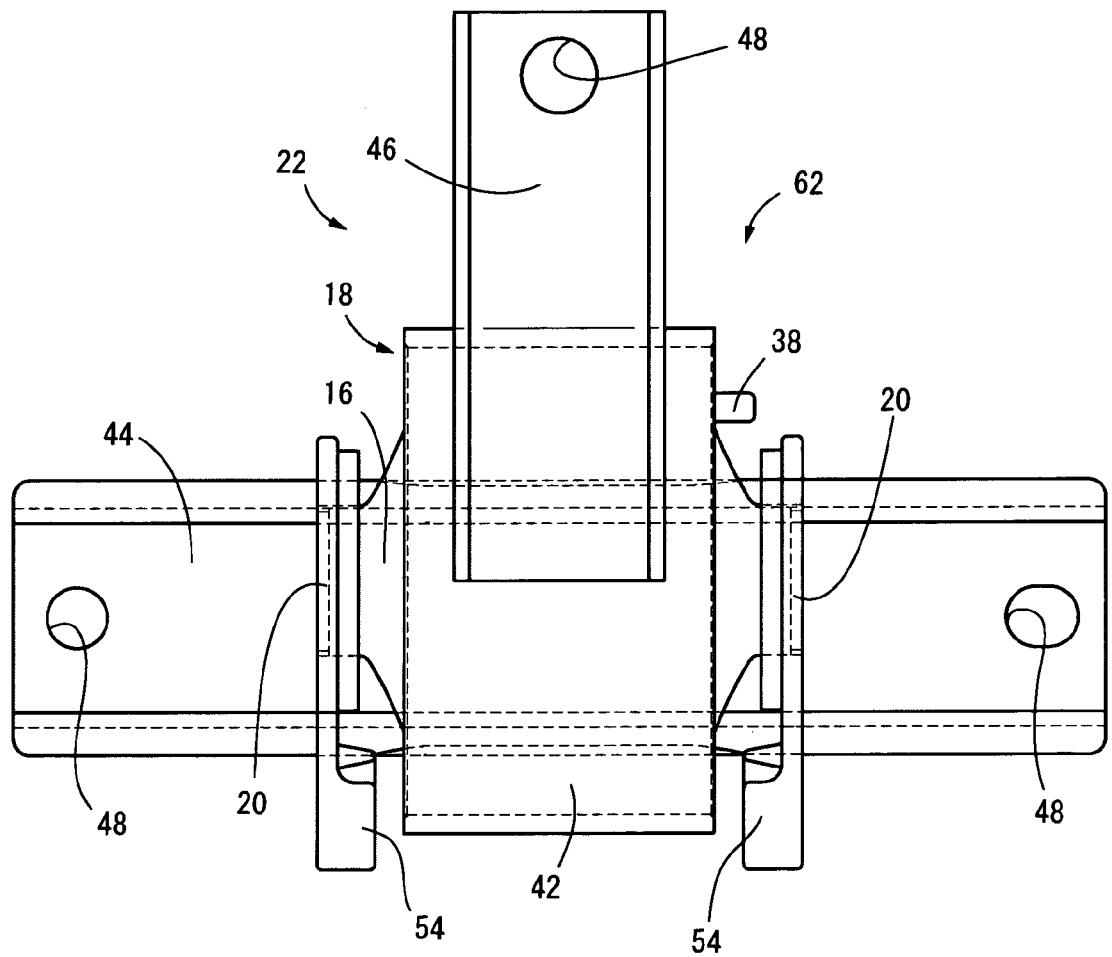
FIG. 9 is a plane view suitable for explaining one manufacturing step of the torque roll mount of FIG. 1, where the mount unit of FIG. 4 is assembled with the outer bracket of FIG. 7, and a pair of rubber stop plates constituting the torque roll mount.
Figure 10:
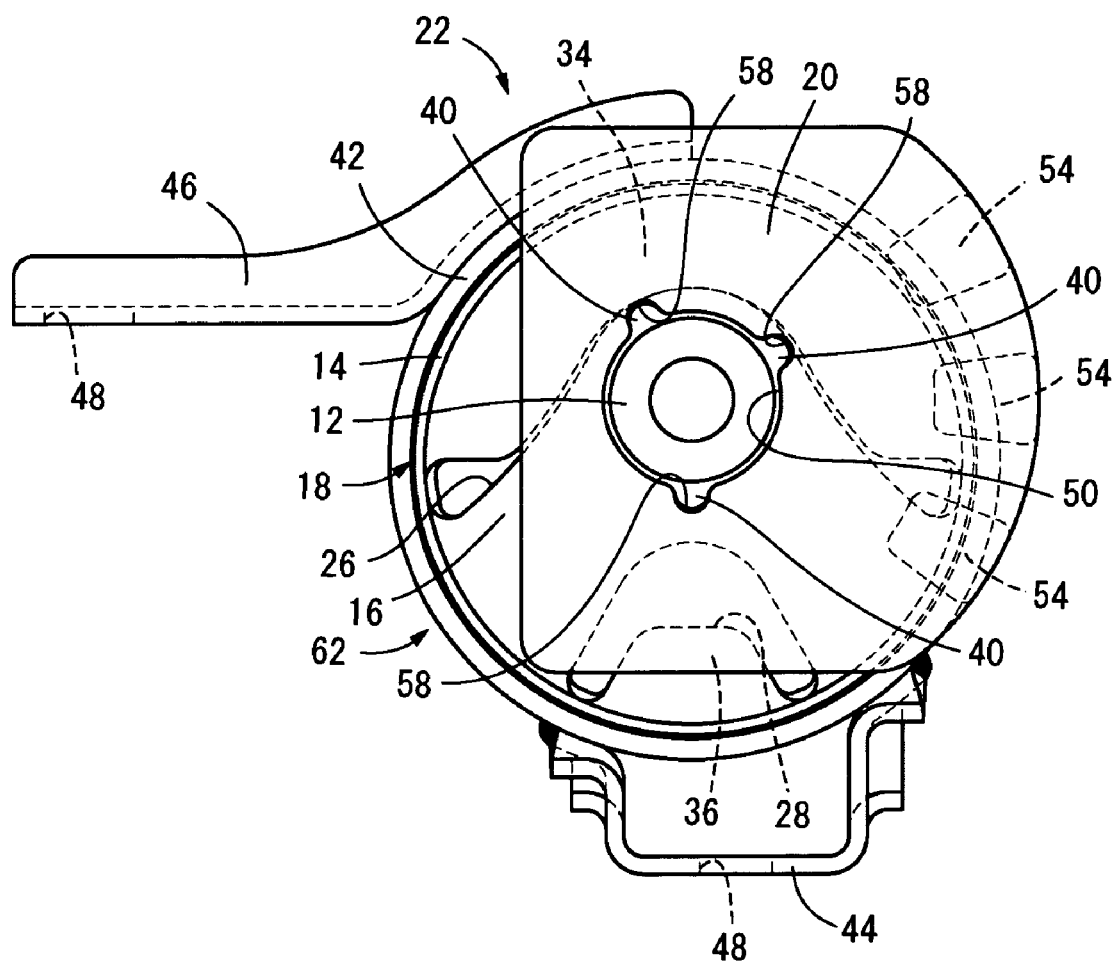
FIG. 10 is a left-side elevational view of the torque roll mount of FIG. 9.
Figure 11:
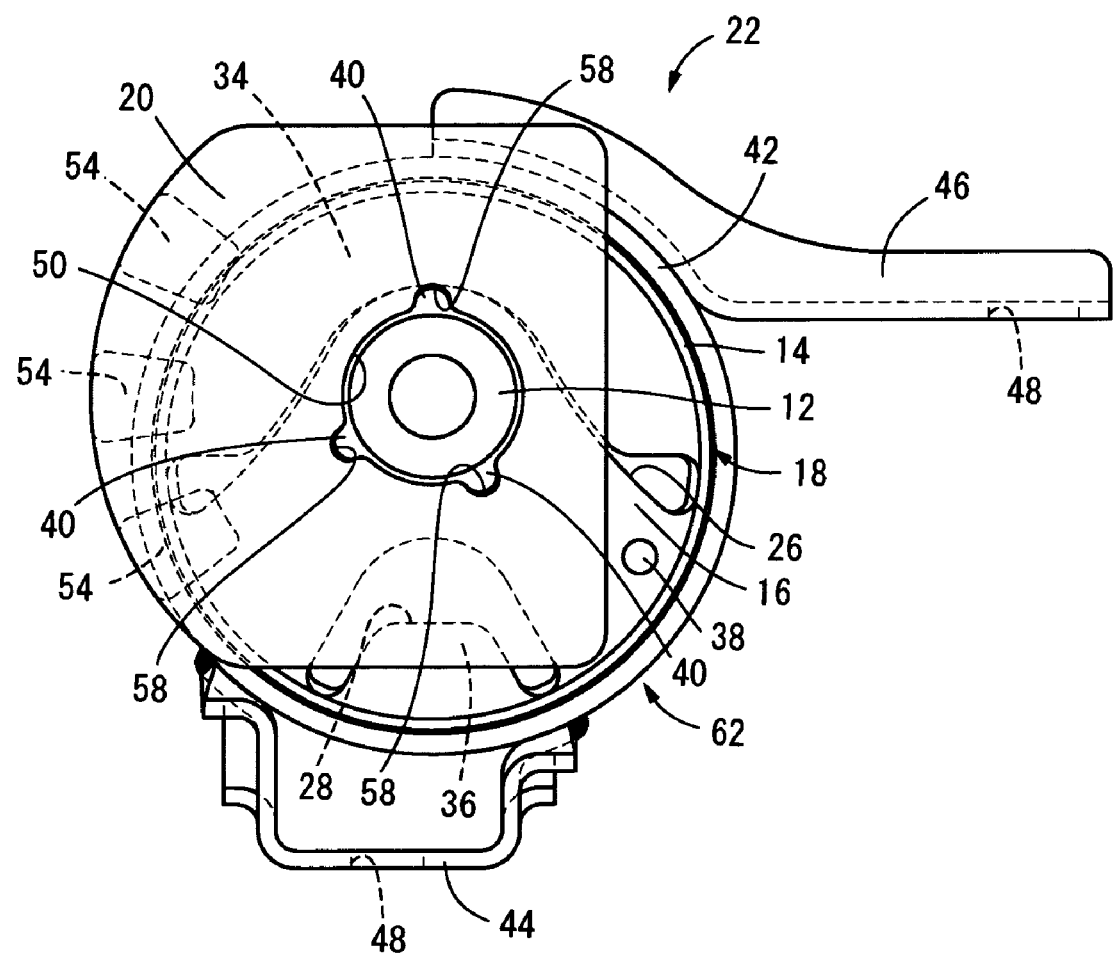
FIG. 11 is a right-side elevational view of the torque roll mount of FIG. 9.

As shown in FIGS. 9-11, the mount body 18 is press-fit into the fitting cylinder 42 of the outer bracket 22 from one side in the axial direction, so that the outer bracket 22 is secured fitting onto the outside of the mount body 18. During the press fitting procedure, the mount body 18 varies in shape and in the diametrical spring characteristics thereof in the circumferential direction about the center axis, and the outer bracket also varies in shape in the circumferential direction about the center axis in relation to the locations of the first and second fastener legs 44, 46. Accordingly, since the mount body 18 and the outer bracket 22 are both of non-rotating body shape, when assembled together, they must be positioned relatively in the circumferential direction about the center axis.

This positioning may be accomplished by procedures known in the art, using a press-fitting jig. Specifically, employed may be a process wherein the outer bracket 22 is supported resting so that the center axis of the fitting cylinder 42 is generally aligned with the plumb vertical direction, and the mount body 18 is then overlapped on the same center axis and pressed in from above in the axial direction, in order to position the outer bracket in the circumferential direction on the lower base jig. In this process, it is possible to effect relative positioning advantageously by, for example, forming a mating portion that mates with the first fastener leg 44, as well as providing a mating pin that fits into the upper and lower slits 26, 28 formed in the mount body 18, the pin projecting upwardly through the fitting cylinder 42 of the outer bracket 22 from the lower base jig, by means of which mating pin the mount body 18 overlapping the fitting cylinder 42 is positioned in the circumferential direction.

After the mount body 18 has been press-fit into the outer bracket 22, the pair of rubber stop plates 20, 20 are installed on the mount body 18 in the illustrated manner.

Figure 12:
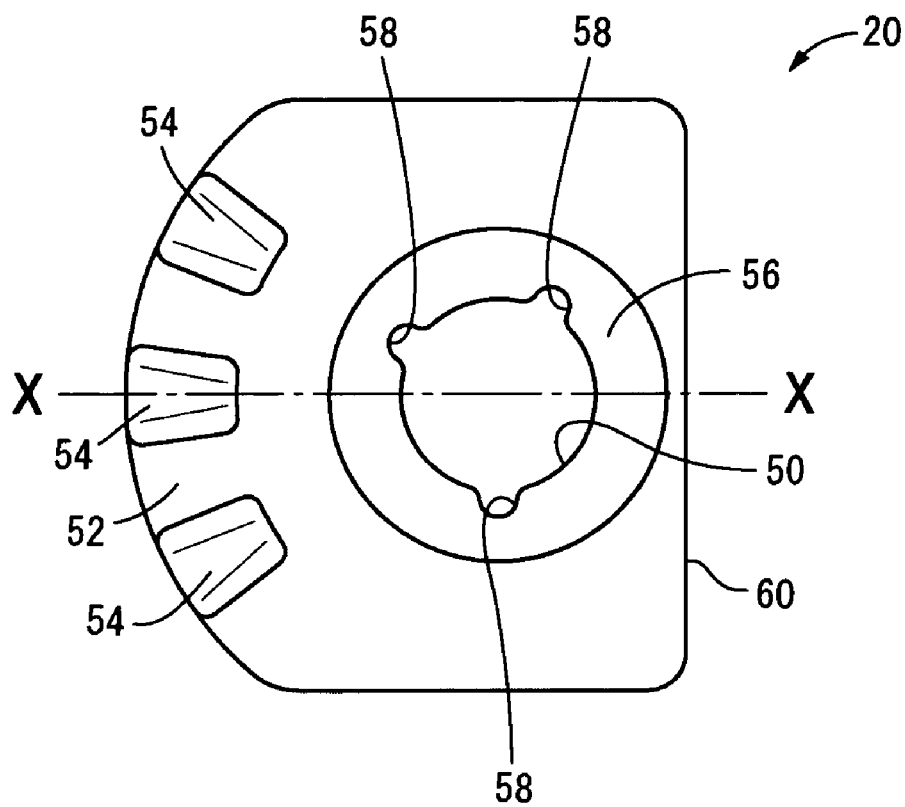
FIG. 12 is a (front/rear) side elevational view of the rubber stop plate of FIG. 9.
Figure 13:
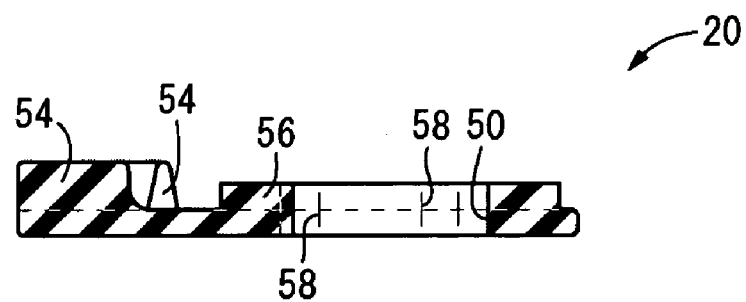
FIG. 13 is a cross sectional view of FIG. 12.
Figure 14:
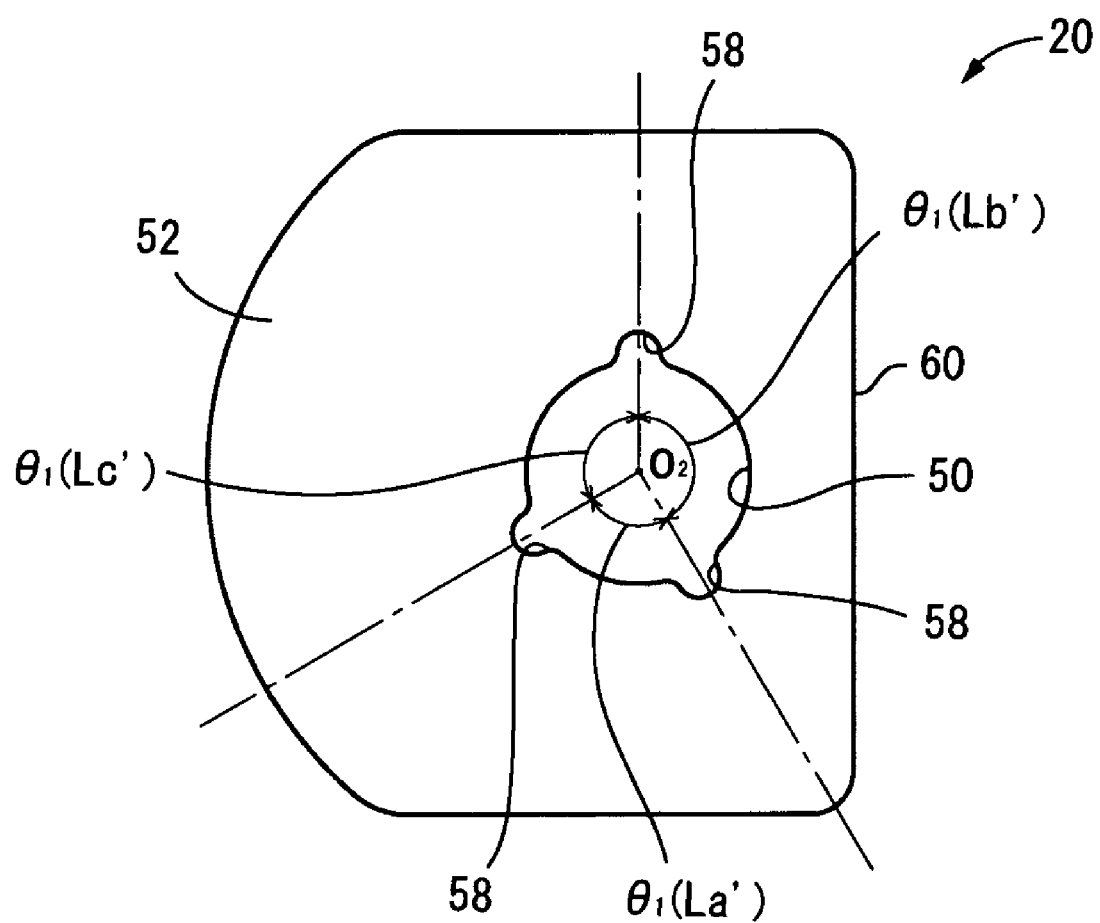
FIG. 14 is a (front/rear) side elevational view of the rubber stop plate of FIG. 9.

As shown in FIGS. 12-14, this pair of rubber stop plates 20, 20 are generally identical overall to one another. Specifically, each is an integral vulcanization molded product comprising a rubber elastic body of generally rectangular plate shape spreading out with generally uniform thickness dimension, and perforated at a location eccentric by a predetermined extent from the center thereof by a round mount hole 50. A first outer edge portion, situated on the opposite side from the direction of eccentricity of the mount hole 50 and furthest away from the mount hole 50, constitutes a contact-side edge portion 52 of arcuate shape extending generally about the center axis of the mount hole 50.

On the rubber stop plate 20 at the contact-side edge portion 52 thereof are integrally formed elastic projections 54, 54, 54 that project towards a first face (the front face in FIG. 13, hereinafter also referred to as the front) side. These elastic projections 54, 54, 54 are all integrally formed with peak-shaped cross section that constricts in width gradually going towards the projecting distal end, and extend diametrically outward along a diametrical line from the center axis of the mount hole 50. The elastic projections 54, 54, 54 are positioned spaced apart from one another by predetermined distance (in this embodiment, approximately identical distance) in the circumferential direction of the contact-side edge portion 52.

In the rubber stop plate 20, the perimeter of the mount hole 50 thereof is thicker and projects towards the front side to form a thick reinforcing portion 56 of annular configuration that extends over a predetermined width in the circumferential direction. This thick reinforcing portion 56 has three or more mating recesses 58, 58, 58 formed at a number of locations on the circumference on the inside peripheral face thereof, which is continuous with the face of the mount hole 50. These mating recesses 58, 58, 58 are formed in number corresponding to the number of mating protrusions 40, 40, 40 (accordingly, three in this embodiment) that project out from the axial end outer peripheral faces of the inner sleeve 12, and are formed as a recessed groove configuration having cross section that is generally the same as the mating protrusions 40 but slightly larger, and that extends in the thickness direction (vertical direction in FIG. 13) over substantially the entire inside peripheral face of the thick reinforcing portion 56 and the inside peripheral face of the mount hole 50. That is, in this embodiment, the three mating recesses 58, 58, 58 all have generally the same shape, corresponding to the mating protrusions 40.

These three mating recesses 58, 58, 58 are positioned predetermined distances apart from one another in the circumferential direction of the mount hole 50. Here, the three mating recesses 58, 58, 58 are established at relative distances: La', Lb', Lc' which are the same as those for the corresponding mating protrusions 40, 40, 40 in the inner sleeve 12. Specifically, in this embodiment, in preferred practice these will be established such that $\theta_1$ (La')=90±10°, $\theta_1$ (Lb')=150±10°, and $\theta_1$ (Lc')=120±10°, more preferably $\theta_1$ (La')≈90°, $\theta_1$ (Lb')≈150°, $\theta_1$ (Lc')≈120°. $\theta_1$ (La), $\theta_1$ (Lb) and $\theta_1$ (Lc) indicate the angles for establishing distances apart from one another in the circumferential direction of adjacent pairs of mating recesses 58, 58, about a center point: $O_2$ which is the center axis of the mount hole 50.

The locations of these three mating recesses 58, 58, 58 are identified not only relative position in the circumferential direction, but also in relation to absolute position in the circumferential direction, in terms of relationship with the front/back of the rubber stop plate 20 and in terms of relationship with the formation location of the elastic projections 54.

Additionally, in this embodiment, the two sides of the rubber stop plate 20 situated to either side of the center axis of the mount hole 50, and to either side of a single line: X-X that is the direction of eccentricity of the mount hole 50 (sideways in FIG. 12), i.e. a straight line: X-X extending in the direction of opposition of the contact-side edge portion 52 at which the elastic projections 54, 54, 54 are formed and the opposite side 60 thereof, are of mutually symmetrical configuration including the elastic projections 54, 54, 54. Only the three mating recesses 58, 58 formed on the inside peripheral face of the mount hole 50 are not in axis-symmetrical relationship with regard to line X-X as described above.

This relationship is now described more specifically. The pair of rubber stop plates 20, 20 are installed on the mount body 18 that has been press-fit into the outer bracket 22, with the mount hole 50 thereof fitting onto the outside of the two axial end portions of the inner sleeve 12 thereof. It is possible for this installation procedure to be performed manually by a human operator.

Here, the shape and size of the mating protrusions and recesses 40, 58 are such that the rubber stop plates 20 cannot be attached to the inner sleeve 12 unless the mating recesses 58, 58, 58 are positioned at relative positions with respect to the mating protrusions 40, 40, 40 projecting from the inner sleeve 12 and mated together therewith.

Additionally, the three mating protrusions 40, 40, 40 on the inner sleeve 12 are formed at different distances apart from one another in the circumferential direction. Therefore, in order to have the three mating protrusions 40, 40, 40 mated with the three mating recesses 58, 58, 58 formed on the rubber stop plate 20, mating cannot be accomplished without identifying the front/back of the rubber stop plate 20.

Further, since the three mating projections 40, 40, 40 formed on the inner sleeve 12 are formed at relative locations that are mutually point-symmetrical to either axial side of the inner sleeve 12, that is, at locations whose phase is reversed in the circumferential direction, if it is attempted to fit identical rubber stop plates 20, 20 therein, rubber stop plates 20, 20, where based unfailingly on one orientation in the axial direction of the inner sleeve 12 (for example, orientation facing from left to right in FIG. 9), will not be able to be mated unless front and back are established in reverse at left and right of the inner sleeve 12.

Accordingly, when installing the rubber stop plates 20, 20 on the inner sleeve 12, the front and back thereof will be identified of their own accord as shown in FIGS. 9-11 and will be installed with the front of each oriented towards the mount body 18; additionally, the circumferential position will be identified, and installed facing one another in the axial direction. In other words, since the pair of rubber stop plates 20, 20 installed on the two axial ends of the inner sleeve 12 are axis-symmetrical to either side of a line: X-X, positioned in opposition to one another disposed in plane-symmetrical condition to one another in the mount axis direction to either size of the axial direction of the mount body 18 and the outer bracket 22, i.e. in a relationship resembling a mirror image.

The mating protrusions 40, 40, 40 of the inner sleeve 12 are established such that the line: X-X which is the line of symmetry in the rubber stop plates 20, 20 is the horizontal direction, the direction perpendicular to the direction of eccentricity of the inner and outer sleeves 12, 14 in the mount body 18. In the installed state, the three elastic projections 54, 54, 54 of each of the rubber stop plates 20, 20 are all positioned with respect to the axial end faces of the outer sleeve 14 and the fitting cylinder 42 of the outer bracket 22, and in particular with respect to the portion situated on the diametrically opposite side from the second fastener leg 46, situated in opposition spaced apart by a predetermined distance: L in the axial direction.

In the mount installed state, by means of the distributed support load of the power unit being applied across the inner sleeve 12 and the outer sleeve 14 so that the inner and outer sleeves 12, 14 are disposed generally on the same center axis, the elastic projections of the rubber stop plates 20, 20 are established positioned so as to be positioned against the axial end faces of the outer sleeve 14 and the fitting cylinder 42 of the outer bracket, generally along the circumferential direction thereof.

Further, as shown in FIGS. 1-3, the inner bracket 24 is attached to the assembly 62 to which the left and right rubber stop plates 20, 20 have been assembled in the manner described above.

Figure 15:
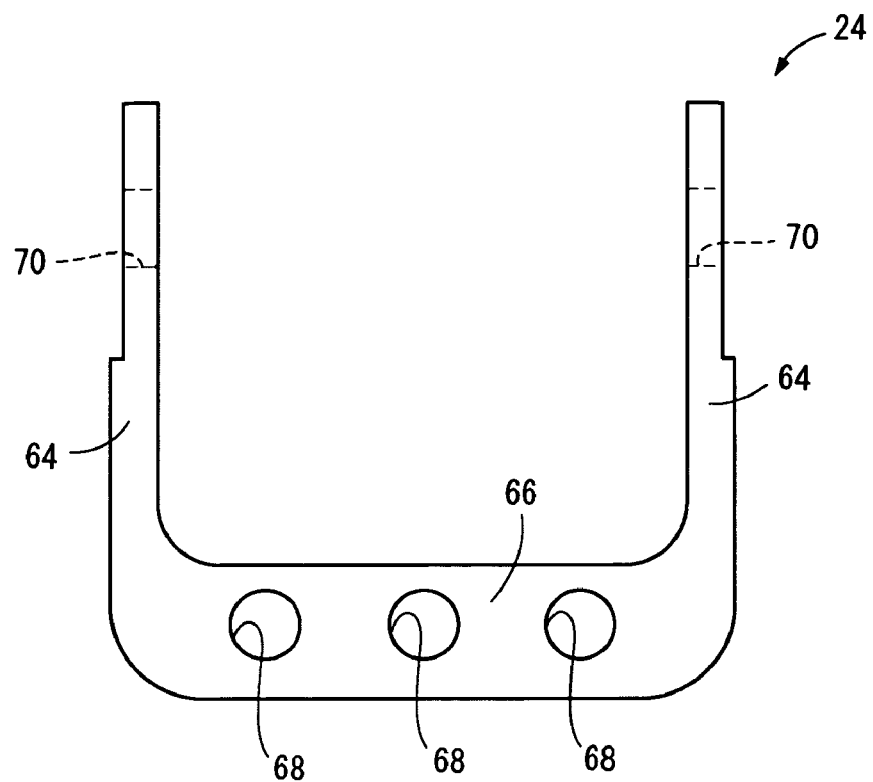
FIG. 15 is a plane view of an inner bracket of the torque roll mount of FIG. 1.
Figure 16:
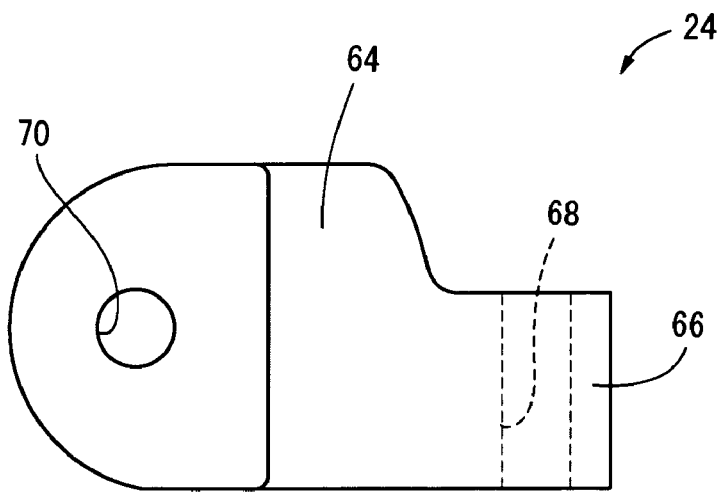
FIG. 16 is a left-side elevational view of the inner bracket of FIG. 15.
Figure 17:
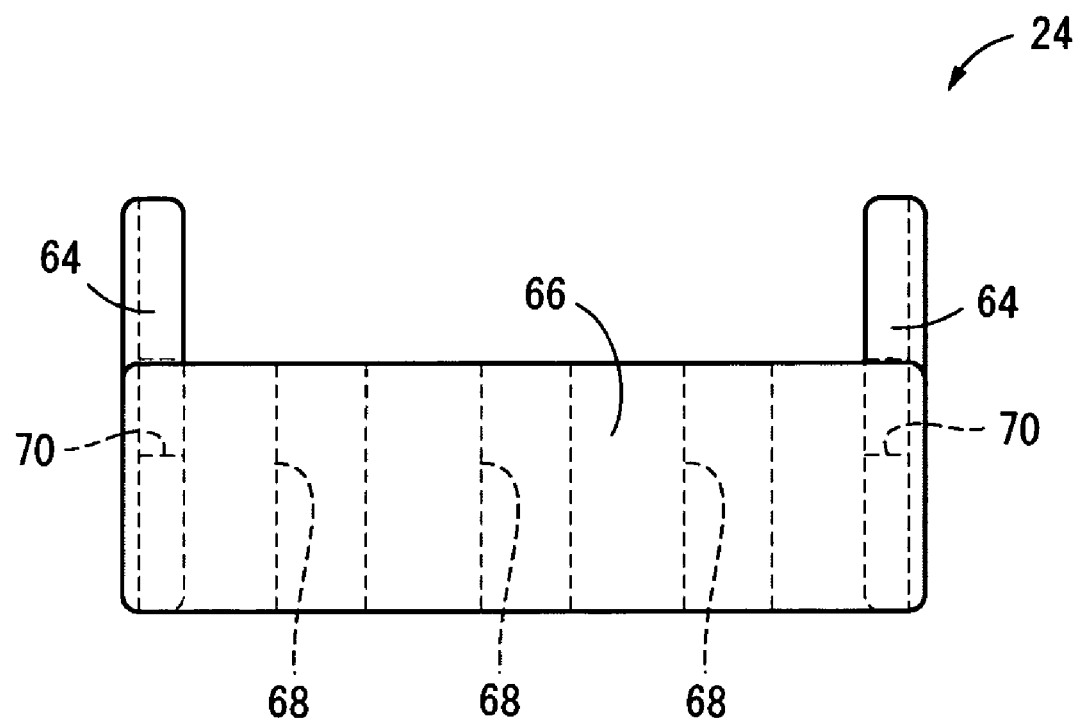
FIG. 17 is a front elevational view of the inner bracket of FIG. 15

As shown in FIGS. 15-17, this inner bracket 24 has a shape extending with predetermined width in a thick-walled generally open-square shape, constructed of, by way of contact members spreading out in the axis-perpendicular direction (vertical direction in FIG. 15), a pair of left and right support plates 64 situated in opposition spaced apart in the axial direction by means of being linked by means of a linking portion 66 extending in the axial direction (sideways in FIG. 15). The linking portion 66 has the form of an extended rectangle, the axial medial portion of which is perforated by a number of fastening bolt holes 68 (three in this embodiment) which pass through the linking portion 66 in the lateral direction (vertical direction in FIG. 17).

The support plates 64 are of thin-walled, generally flat rectangular shape, and in particular the front facing axially inward is generally smooth over its entirety. The pair of left and right support plates 64 are each perforated in the axial direction by a through-hole 70. These through-holes 70, 70 are positioned in opposition on a given axial line extending parallel with the direction of opposition of the pair of support plates 64 (sideways in FIG. 15). One outside peripheral edge of the support plate 62, which edge is situated furthest away from the linking portion 66 has a generally arcuate shape generally extending around the center axis of the through-hole 70.

The axially inward-facing face of each support plate 64 in the inner bracket 24 is superposed in intimate contact with the back face (which is devoid of projecting elastic projections 54) of each rubber stop plate 20 (face facing axially outward), and a long fastening bolt 72 is inserted from the through-hole 70 in one of the support plates, passed through the mount hole 50, the bore of the inner sleeve 12, the other mount hole 50, and the other through-hole 70, the distal end portion projecting out from the other through-hole 70 being threadably secured to the other support plate 64 with a fastening nut 74, thereby securing the inner bracket 24 to the assembly 62 comprising the mount body 18 and the outer bracket 62. The torque roll mount 10 according to this embodiment is constructed in the above manner.

In the assembled state described above, the generally flat face of each support plate 64 facing axially inward is superposed in intimate contact with the back face (which is devoid of projecting elastic projections 54) of each rubber stop plate 20, thereby functioning a support face for the rubber stop plate 20 extending in the axis-perpendicular direction.

In this way, the torque roll mount 10 is installed at the appropriate site between the power unit and the vehicle body, such that with for example one axial direction of the mount body 18 from which the differentiating projection 38 projects oriented towards the rear of the vehicle (to the right in FIGS. 1, 2), the axial direction of the mount body 18 positioned in opposition to the pair of rubber stop plates 20, 20 is coincident with the vehicle front-back direction, and with the cushioning stopper 34 in the mount body 18 positioned above the other cushioning stopper 38, one axis-perpendicular direction of the mount body 18 positioned with the stoppers 34, 38 in opposition to either side of the inner sleeve 12 is coincident with the vehicle vertical direction (the vertical in FIGS. 1, 3). Fastening bolts (not shown) are then passed through the bolt holes 68 in the inner bracket 24 to fasten the bracket 24 to the power unit via the fastening bolts, and fastening bolts (not shown) are passed through the bolt holes 48 in the outer bracket 22 to fasten the bracket 22 to the vehicle body via the fastening bolts. In this way, the torque roll mount 10 is installed between the power unit and the vehicle body, so that the power unit is supported in vibration-damped manner on the vehicle body.

In this embodiment in particular, when a large load is exerted across the inner sleeve 12 and outer sleeve 14 in the vehicle front-back direction, the inner sleeve 12 comes into contact, via at least one elastic projection 54 of the rubber stop plates 20 fixedly installed at the two axial ends thereof, with the axial end of the fitting cylinder 42 of the outer bracket 22, and hence with the axial end of the outer sleeve 14 fixedly installed on the fitting cylinder 42. Thus, the level of relative displacement of the inner sleeve 12 and the outer sleeve 14 in the axial direction is restricted in cushion-wise manner.

In the torque roll mount 10 of this construction, the three mating protrusions 40, 40, 40 projected from the two axial ends of the inner sleeve 12 are formed at different distances apart in the circumferential direction, and the mating protrusions 40 at one end are all positioned so as not to be opposite in the axial direction to the mating protrusions 40 at the other end. Further, the circumferential spacing distance and shape of the three mating recesses 58, 58, 58 formed in the mount hole 50 of the pair of rubber stop plates 20, 20 correspond to the three mating protrusions 40, 40, 40 formed at each end of the inner sleeve 12. As a result, with the elastic projection 54 of the pair of rubber stop plates 20, 20 positioned in opposition in the axial direction, each mating recess 58 of one of the rubber stop plates 20 is positioned so as not to be opposite to any mating recess 58 of the other rubber stop plate 20 in the axial direction.

Accordingly, only one of the rubber stop plates 20 provided with three mating recesses 58, 58, 58 corresponding to the three mating protrusions 40, 40, 40 formed at one end of the inner sleeve 12 can be fit onto the inner sleeve 12. Thus, with both rubber stop plates 20, 20 installed, the elastic projections 54 of the rubber stop plates 20 will be positioned in opposition in the axial direction to either side of the outer sleeve 14.

For this reason, if the circumferential positions of the rubber stop plates 20 differ, or if the projection direction of the elastic projection 54 is reversed, the rubber stop plate 20 cannot be installed onto the inner sleeve 12, whereby improper assembly can be prevented altogether, so that consistency of quality and efficiency of operations may be improved.

Also, in this embodiment, improper assembly of the rubber stop plates 20 is prevented by means of mating members composed of three sets of mating protrusions 40 and mating recesses 58, leading to simplified manufacture of the mount.

Further, in this embodiment, the outer bracket 22 equipped with first and second fastener legs 44, 46 is secured fitting onto the outside of the outer sleeve 14, and a differentiating projection 38 for differentiating in the axial direction is disposed on the mount body 18. With this arrangement, the installation direction of the mount body 18 with respect to the outer bracket 22 can be specified in the axial direction, whereby, even in instances where the installation direction of the outer bracket 22 with respect to the mount body 18 in the circumferential direction is specified by means of the projection direction of the fastener legs 44, 46, etc., the mount position of the outer bracket 22 with respect to the mount body 18 in the circumferential direction can be established with certainty.

Also, in this embodiment, when manufacturing the torque roll mount 10, as noted, there is employed a method of manufacturing a cylindrical vibration damping apparatus by a process of (a) preparing a mount body 18 having three mating protrusions 40, 40, 40 provided at each of the two axial ends of the inner sleeve 12 by means of integral vulcanization molding of the inner sleeve 12 and the outer sleeve 14 with the rubber elastic body 16, (b) preparing an assembly 62 wherein the outer bracket 22 has been attached to the mount body 18 using a press-fitting jig, by means of press-fitting the outer sleeve 14 into the outer bracket 22 having first and second legs 44, 46 welded thereto, while specifying the axial direction of the mount body 18, (c) preparing a pair of rubber stop plates 20 having formed on the inner peripheral face of the mount hole 50 three mating recesses 58, 58, 58 which correspond to the formation locations of the three mating protrusions 40, 40, 40 at each end of the inner sleeve 12, and then (d) fitting the mount hole 50 of each of the pair of rubber stop plates 20, 20 onto one of the two axial ends of the inner sleeve 12 in the assembly 62, and mating the mating recesses 58 of each rubber stop plate 20 with the mating protrusions 40 in the inner sleeve 12, in order to install the pair of rubber stop plates 20, 20 onto the inner sleeve 12 while identifying their front and back, and identifying their circumferential position around the inner sleeve 12.

By employing the method of the invention for the torque roll mount 10 of this embodiment, it is possible to install the pair of rubber stop plates 20, 20 onto the mount body 18 while correctly identifying their front/back and circumferential position, it will be possible to considerably reduce the burden of labor, including sustained attention, required of the operator, so that problems resulting from improper installation, such as those discussed previously, are effectively resolved, and so that is it possible to achieve excellent production efficiency.

Figure 18:
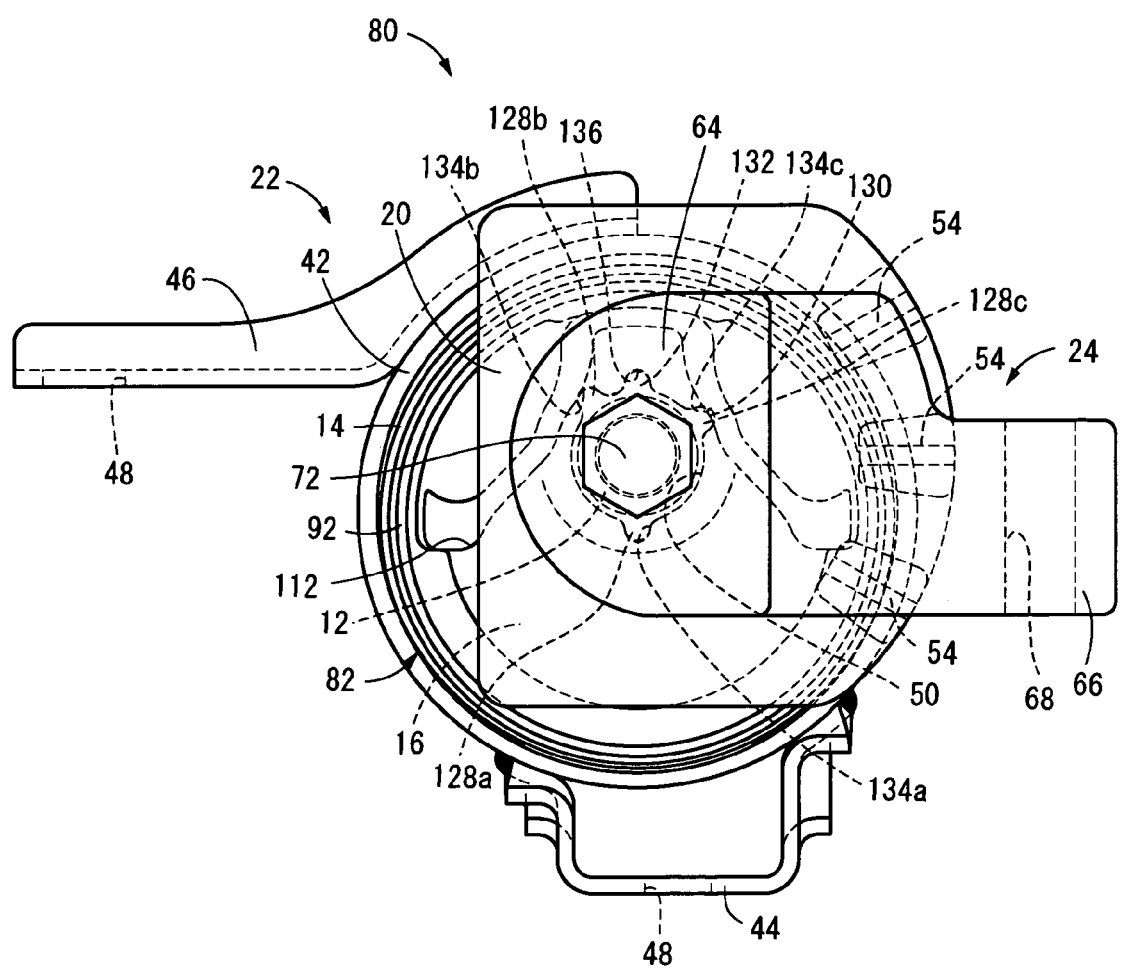
FIG. 18 is a left-side elevational view of a torque roll mount of construction according to a second embodiment of the present invention, corresponding to FIG. 3.
Figure 19:
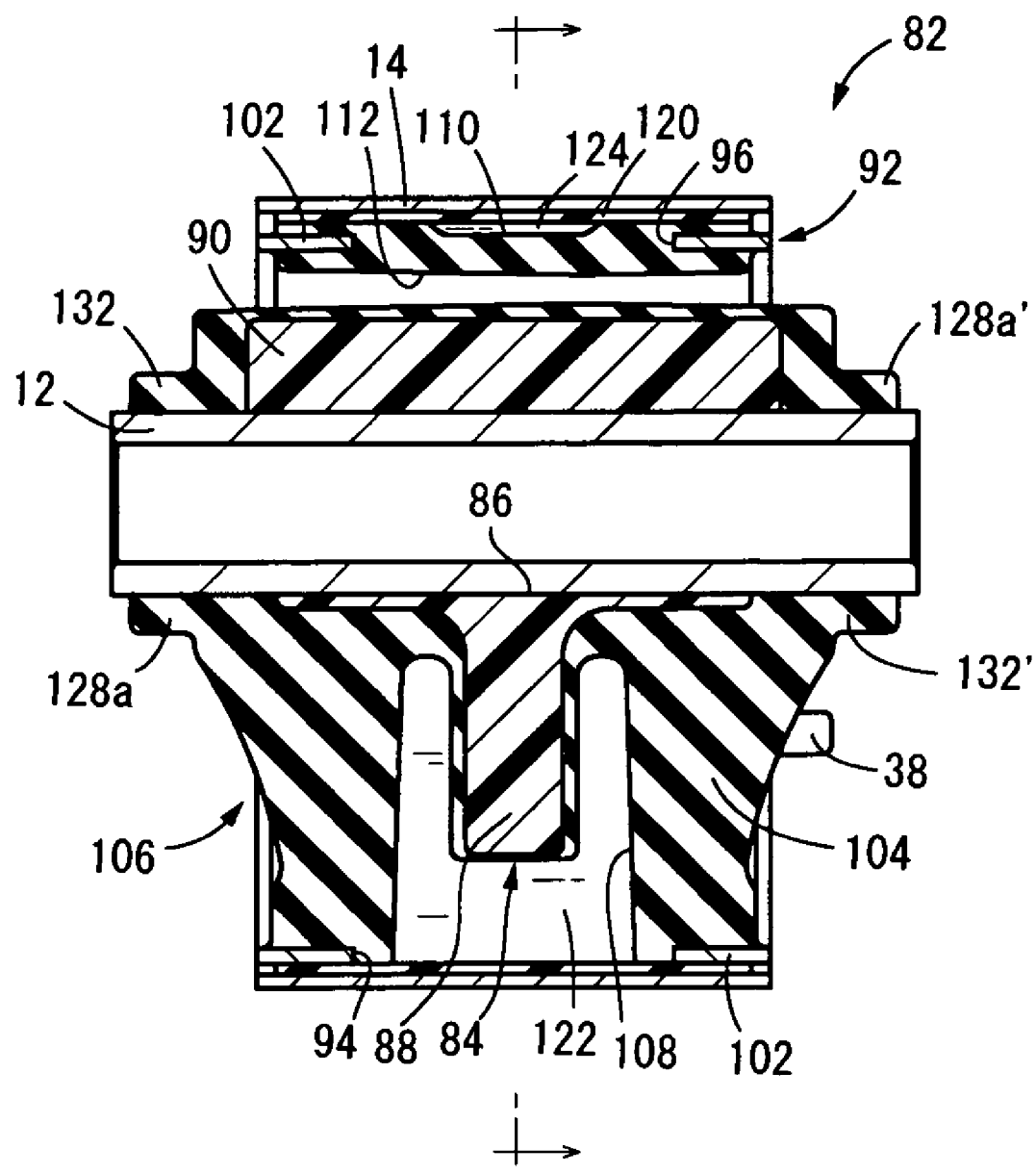
FIG. 19 is an axial cross sectional view of a mount unit of the torque roll mount of FIG. 18, corresponding to FIG. 4.
Figure 20:
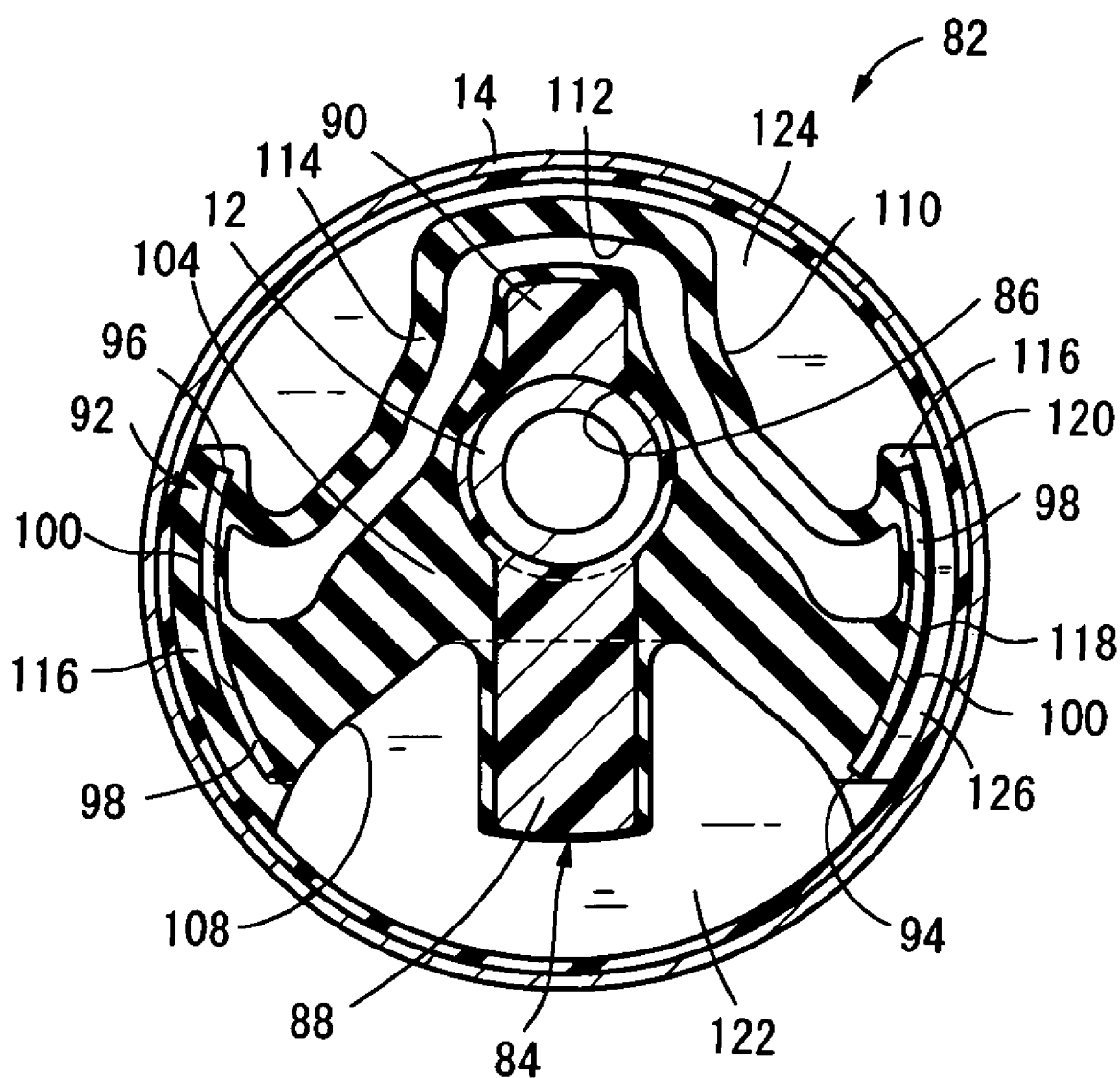
FIG. 20 is a cross sectional view of the mount unit of FIG. 19 taken along line 20-20 of FIG. 19.

Referring next to FIG. 18, there is shown a fluid-filled-type automotive engine mount 80 of construction according to a second embodiment of the cylindrical vibration damping apparatus of the present invention. This engine mount 80 comprises a mount body 82 as a vibration damping apparatus having a non-compressible fluid sealed therein, vibration damping effect being provided by flow action and the like of the non-compressible fluid. In the description hereinbelow, parts and regions substantially identical in structure to those in the preceding first embodiment are assigned identical symbols, and are not discussed in any detail.

More specifically, as shown in FIGS. 19-22, the inner sleeve 12 pertaining to this embodiment constitutes part of the mount body 82. On the outer peripheral face of the inner sleeve 12 is secured a stop member 84 formed of fiber-reinforced resin, metal, or other rigid material. This stop member 84 is disposed with a mount hole 86 formed in the generally center portion thereof fitting onto the outside of the inner sleeve 12, and in the axial center portion of the inner sleeve 12 are integrally formed a bound stopper portion 88 and a rebound stopper portion 90 extending in mutually opposite directions in one direction in the axis-perpendicular direction (the vertical in FIGS. 19, 20). The bound stopper portion 88 has a generally rectangular pillar shape projecting to one side in the axis-perpendicular direction (down in FIG. 19) from the axially medial portion of the inner sleeve 12. The rebound stopper portion 90 projects towards the other side in the axis-perpendicular direction (up in FIG. 19) from the axially medial portion of the inner sleeve 12, and has a pillar shape of generally uniform cross section extending the axial direction of the mount 80 (sideways in FIG. 19).

Diametrically outside of the inner sleeve 12 there is disposed a metal sleeve 92 serving as a medial sleeve, situated a predetermined distance away in the diametrical direction and eccentric by a predetermined extent. The metal sleeve 92 has a thin-walled, generally cylindrical shape, in the axial center portion of which are formed a first window portion 94 and a second window portion 96 of generally rectangular shape in plan view, extending over predetermined length in the circumferential direction (for example, length just short of halfway around the circumference). The first window portion 94 and second window portion 96 are situated in opposition in one direction in the diametrical direction (the vertical in FIGS. 19, 20) which is the direction of eccentricity of the metal sleeve 92 and inner sleeve 12. Between the two circumferential ends of the first window portion 94 and second window portion 96 are respectively formed linking portions 98 whose axially medial portion is recessed inwardly in the diametrical direction so as to constrict in diameter. By means of this, there is formed on the outer peripheral face of the linking portion 98 in the metal sleeve 92 a wide circumferential groove 100 that opens outwardly in slot configuration in the diametrical direction, and that extends straddling in the circumferential direction between the two circumferential ends of the first window portion 94 and second window portion 96. In other words, the metal sleeve 92 has a structure wherein a pair of ring-shaped portions 102, 102 disposed on the same center axis a predetermined distance apart in the axial direction are integrally linked by means of a pair of linking portions 98, 98.

Between the inner sleeve 12 and the metal sleeve 92 is interposed a rubber elastic body 104. The rubber elastic body 104 has a thick-walled, generally cylindrical shape, the inside peripheral face of which is bonded by vulcanization to the outside peripheral face of the inner sleeve 12, and the outside peripheral face of which is vulcanization bonded to the inside peripheral face of the metal sleeve 92. That is, the rubber elastic body 104 forms an integral vulcanization molded product 106 with the inner sleeve 12 and the metal sleeve 92. To the outside peripheral face of the metal sleeve, a thin-walled sealing rubber layer integrally formed with the rubber elastic body 16 is vulcanization bonded over substantially the entirety thereof.

Further, a first pocket portion 108 is disposed on the rubber elastic body 104, to one side in the direction of eccentricity of the metal sleeve 92 and inner sleeve 12 (the vertical in FIGS. 19, 20), opening onto the outside peripheral face through the first window portion 94 of the metal sleeve 92. A second pocket portion 110 is disposed to the other side in the direction of eccentricity, opening onto the outside peripheral face through the second window portion 96 of the metal sleeve 92.

In the interior of the first pocket portion 108, the bound stopper portion 88 of the stop member 84 projects from the center of the bottom wall. A thin-walled cushioning rubber layer integrally formed with the rubber elastic body 104 is bonded by vulcanization onto the bound stopper portion 88, so as to cover it entirely.

In the region constituting the bottom wall of the second pocket portion 110 in the rubber elastic body 104, there is formed a lightening hole 112 by way of a lightening portion that extends passing through in the axial direction. In this embodiment in particular, the lightening hole 112, in a generally half-circumferential portion zone to the decreasing side in the direction of eccentricity of the inner sleeve 12 and the metal sleeve 92 in the rubber elastic body 104, passes through a portion situated diametrically inward from the outer peripheral edge portion of the rubber elastic body 104 (bottom floor edge of the second pocket portion 110), extending along this outer peripheral edge portion, and has a generally inverted V shape in plan view overall. By means of this, the bottom wall of the second pocket portion 110 is reduced in thickness, so as to form a diaphragm 114 having the form of a readily deformable, pliable film. The axially central portion of the lightening hole 112, the rebound stopper 90 projects diametrically outward from the inner sleeve 12. A thin-walled cushioning rubber layer integrally formed with the rubber elastic body 104 is vulcanization bonded onto the rebound stopper portion 90, so as to cover it substantially entirely. In this embodiment, the distance separating the circumferential central portion of the lightening hole 112 positioned in opposition to the rebound stopper portion 90 in the axis-perpendicular of the inner sleeve 12, and the distance separating the circumferential end portions of the lightening hole 112 are relatively larger than the axis-perpendicular distances separating the center portion of the lightening hole 112, the circumferential medial portion between the ends, and the inner sleeve 12. The two axial end portions of the rebound stopper portion 90 are positioned in opposition to either side of the lightening hole 112, spaced apart by a predetermined distance with respect to the ring-shaped portions 102, 102 of the metal sleeve 92.

An elastic partition wall 116 integrally formed with the rubber elastic body 104 and the sealing rubber layer is formed covering each of the linking portions 98 of the metal sleeve 92. The elastic partition wall 116 has generally arcuate shape in plan view, and has the same curvature generally as that of the ring-shaped portion 102 of the metal sleeve 92; the two circumferential end portions thereof extend circumferentially outward beyond the end portions of the linking portions 98, extending up to the edge of the first window portion 94 and second window portion 96. At least one of the two elastic partition walls 116, 116 has formed therein a recessed groove 118 extending in helical or straight configuration in the circumferential direction, the opening of the first pocket portion 108 and the opening of the second pocket portion 110 being connected together through the recessed groove 118.

An outer sleeve 14 having a thin-walled, generally large-diameter cylindrical shape is fitted onto the outside of this integral vulcanization molded product 106, and subjected to diameter reduction by means of all-around caulking or the like, to secure it fitting onto the metal sleeve 92. In particular, a thin sealing rubber layer 120 is formed covering substantially the entire inside peripheral face of the outer sleeve 14. On the basis of this, the outer sleeve 14 is secured fitting in fluid tight fashion superposed against the outside peripheral face of the metal sleeve 92, via the sealing rubber layer 120 and a sealing rubber layer covering the metal sleeve 92, etc. As a result, the first pocket portion 108 and second pocket portion 110 in the rubber elastic body 16 and the recessed groove 118 of the elastic partition wall 116 are provided with fluid-tight closure by the outer sleeve 14.

Accordingly, on the large side in the direction of eccentricity between the inner sleeve 12 and the outer sleeve 14 (the lower side in FIGS. 19, 20), a portion of the wall is constituted by the bottom wall portion of the first pocket portion 108 of the rubber elastic body 104, forming a pressure-receiving chamber 122 that undergoes pressure fluctuation when vibrational load is input in the diametrical direction across the inner sleeve 12 and the outer sleeve 14. On the small side in the direction of eccentricity between the inner sleeve 12 and the outer sleeve 14 (the upper side in FIGS. 19, 20), there is formed an equilibrium chamber 124 that by being situated on the outer peripheral side of the lightening hole 112, substantially avoids transmission of stress from the inner sleeve 12, and a portion of whose wall is constituted by the bottom wall portion of the second pocket portion 110 of the rubber elastic body 104, i.e. a readily deformable diaphragm 114, so as to readily permit change in volume on the basis of elastic deformation of the diaphragm 114. The pressure-receiving chamber 122 and the equilibrium chamber 124 have non-compressible fluid sealed therein. As the sealed fluid there may be employed, for example, water, alkylene glycol, polyalkylene glycol, silicone oil, or the like. In terms of effectively achieving vibration damping effect on the basis of resonance action or other such flow action of the fluid, it is preferable to employ low-viscosity fluid of 0.1 Pa·s or lower. Sealing of fluid within the pressure-receiving chamber 122 and the equilibrium chamber 124 may be achieved, for example, by carrying out assembly of the outer sleeve 14 to the integral vulcanization molded product 106 while immersed in non-compressible fluid, for example.

By providing the recessed groove 118 formed opening onto the outside peripheral face of the elastic partition wall 116 with fluid-tight closure by means of the outer sleeve 14, there is formed an orifice passage 126 through which the pressure-receiving chamber 122 and the equilibrium chamber 124 communicate with one another, permitting fluid flow between the two chambers 122, 124. That is, when vibration is input in the diametrical direction of the mount body 82 so that relative pressure fluctuations are given rise to in the pressure-receiving chamber 122 and the equilibrium chamber 124, adequate flow level of fluid caused to flow through the orifice passage 126 is assured so that vibration damping effect is produced on the basis of resonance action or other such flow action of the fluid. The passage length and cross sectional area of the orifice passage 126 can be established in consideration of sealed fluid density, wall rigidity of the pressure-receiving chamber 122 and the equilibrium chamber 124, and so on, so as to achieve effective vibration damping effect of engine shake, idling vibration, booming noises during driving, and other types of vibration targeted for damping, for example.

The bound stopper portion 88 of the stop member 84 that projects diametrically outward from the inner sleeve 12 side is situated inside the pressure-receiving chamber 122, positioned in opposition to the outer sleeve 14 by a predetermined distance. By so doing, when excessive load is exerted in the bound direction, which is the input direction of distributed support load of the power unit, the inner sleeve 12 comes into contact with the outer sleeve 14 via the bound stopper portion 88, whereby the level of relative displacement in the bound direction in the inner and outer sleeves 12, 14 is restricted in a cushion-wise manner.

The rebound stopper portion 90 of the stop member 84 that projects diametrically outward from the inner sleeve 12 side and the pair of ring-shaped portions 102, 102 in the metal sleeve 92 which is secured fitting onto the outside of the outer sleeve 14 are positioned in opposition to either side of the diaphragm 114 etc., on the small side in the direction of eccentricity of the inner sleeve 12 and outer sleeve 14 (sleeve 92). With this arrangement, when excessive load is exerted in the rebound direction, which is the direction opposite the input direction of distributed support load of the power unit, the inner sleeve 12 comes into contact with the outer sleeve 14 via the rebound stopper portion 90 and ring-shaped portions 102, whereby the level of relative displacement in the bound direction in the inner and outer sleeves 12, 14 is restricted in a cushion-wise manner.

Figure 21:
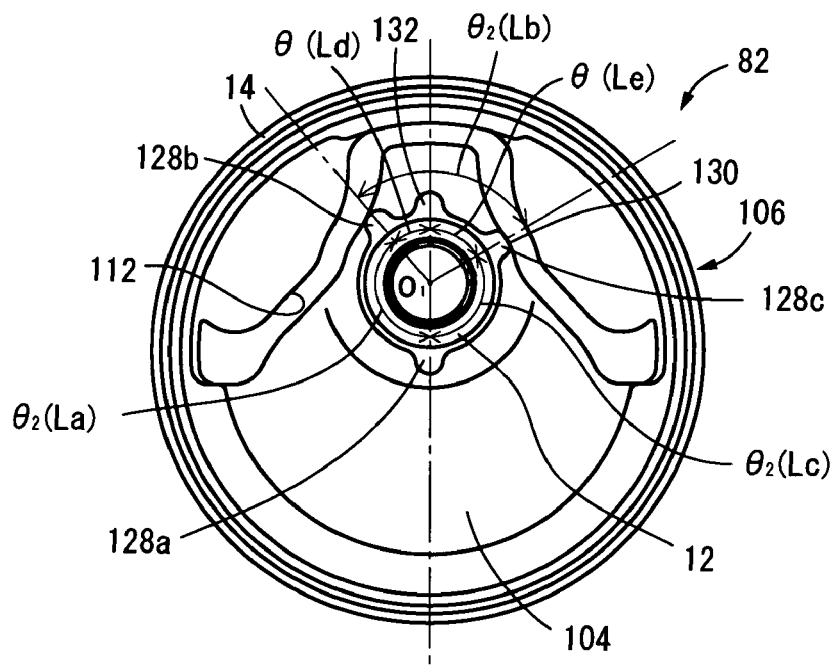
FIG. 21 is a left-side elevational view of the mount unit of FIG. 19, corresponding to FIG. 5.

Here, on the outside peripheral face of one axial end in the inner sleeve 12 (the left end in FIG. 19), there are disposed three mating protrusions 128a, 128b, 128c integrally formed with the rubber elastic body 104. Like the mating protrusions 40 pertaining to the first embodiment, these mating protrusions 128a, 128b, 128c have a generally "hog-backed" shape of generally uniform semi-circular cross-sectional shape extending in the axial direction. In this embodiment in particular, as shown in FIG. 21 the mating protrusion 128a projects in the opposite direction (downward in FIG. 21) from the direction of projection of the rebound stopper portion 90. Thus, the mating protrusion 128a is disposed at a location at which the distal end thereof is away from the area where the lightening hole 112 is formed. In other words, the distal end portion of the mating protrusion 128a does not projected into the lightening hole 112 from the edge of the lightening hole 112.

The mating protrusion 128b projects out between the circumferential central portion of the lightening hole 112 and one end in circumferential direction (left in FIG. 21). In this embodiment in particular, the mating protrusion 128a and mating protrusion 128b are situated apart by a distance: La in the circumferential direction, established such that the angle: $\theta_2$ (La) about the center point: $O_1$ of the inner sleeve 12 defining the positional relationship is preferably $\theta_2$ (La)=150±10°, more preferably $\theta_2$ (La)≈140°. The mating protrusion 128b, on the basis of the lightening hole 112 shape and being established in the aforementioned positional relationship with the mating protrusion 128a, is disposed at a location at which the distal end thereof is away from the area where the lightening hole 112 is formed.

The mating protrusion 128c projects out between the circumferential central portion of the lightening hole 112 and the other end in circumferential direction (right in FIG. 21). In this embodiment in particular, the mating protrusion 128b and mating protrusion 128c are situated apart by a distance: Lb in the circumferential direction, established such that the angle: $\theta_2$ (Lb) about the center point: $O_1$ of the inner sleeve 12 defining the positional relationship thereof is preferably $\theta_2$ (Lb=90±10°, more preferably $\theta_2$ (Lb)≈100°. Further, the mating protrusion 128c and mating protrusion 128a are situated apart by a distance: Lc in the circumferential direction, established such that the angle: $\theta_2$ (Lc) about the center point: $O_1$ of the inner sleeve 12 defining the positional relationship thereof is preferably $\theta_2$ (Lc) =120±10°, more preferably $\theta_2$ (Lc)≈120°.

In this embodiment in particular, the mating protrusion 128c, on the basis of the lightening hole 112 shape and being established in each of the aforementioned positional relationships with respect to the mating protrusion 128a or mating protrusion 128b, is disposed at a location at which the distal end thereof is away from the area where the lightening hole 112 of the rubber elastic body 104 is formed. Here, a notch portion 130 is formed at the distal end of the mating protrusion 128c. The notch portion 130 is formed, for example, during integral vulcanization molding of the mating protrusions 128 with a rubber elastic body 104 having a lightening hole 112, by carrying out integral vulcanization molding of the rubber elastic body 104 and the mating protrusion 128b with the formation location of the distal end of the mating protrusion 128b positioned on the outside peripheral face of the portion projecting axially outward from the lightening hole 112 in the member that passes through the rubber elastic body 104 in the axial direction to form the lightening hole 112. As a result, the projecting dimension of the mating protrusion 128b in the axis-perpendicular direction is restricted, making it smaller than the projecting dimensions of the other mating protrusion 128a and mating protrusion 128c in the axis-perpendicular direction, as well as making it so that the distal end portion of the mating protrusion 128c is situated away from the area of the rubber elastic body 104 where the lightening hole 112 is formed, so that it does not projected into the lightening hole 112 from the edge of the lightening hole 112.

Additionally, on the outside peripheral face of the axial end of the inner sleeve 12 where the three mating protrusions 128a, 128b, 128c are disposed, there is formed a secondary protrusion 132. The secondary protrusion 132, like the mating protrusions 128, has a generally "round-ridge" shape of generally uniform semi-circular cross-sectional shape extending in the axial direction, and is integrally formed with the rubber elastic body 104. In this embodiment in particular, the secondary protrusion 132 projects up from the outside peripheral face of the inner sleeve 12, in the circumferential direction between the mating protrusion 128b and mating protrusion 128c.

More specifically, in order that the secondary protrusion 132 be situated apart from the mating protrusion 128b by a predetermined distance: Ld, the angle: θ (Ld) establishing the distance between the secondary protrusion 132 and the mating protrusion 128b about the center point: $O_1$ of the inner sleeve 12 will be such θ (Ld)=50±10°, preferably θ (Ld)≈40°. Also, in order that the secondary protrusion 132 be situated apart from the mating protrusion 128c by a predetermined distance: Le, the angle: θ (Le) establishing the distance between the secondary protrusion 132 and the mating protrusion 128c about the center point: $O_1$ of the inner sleeve 12 will be such that θ (Le)=50±10°, preferably θ (Le)≈60°. As a result, the secondary protrusion 132 is positioned in opposition in the axis-perpendicular direction to the mating protrusion 128a with the center axis of the inner sleeve 12 therebetween, and situated in the generally center portion of one axial end (left in FIG. 19) in the rebound stopper portion 90 affixed to the inner sleeve 12. The distal end of the secondary protrusion 132 is situated away from the lightening hole 112 by a sufficient distance in the axis-perpendicular direction.

Figure 22:
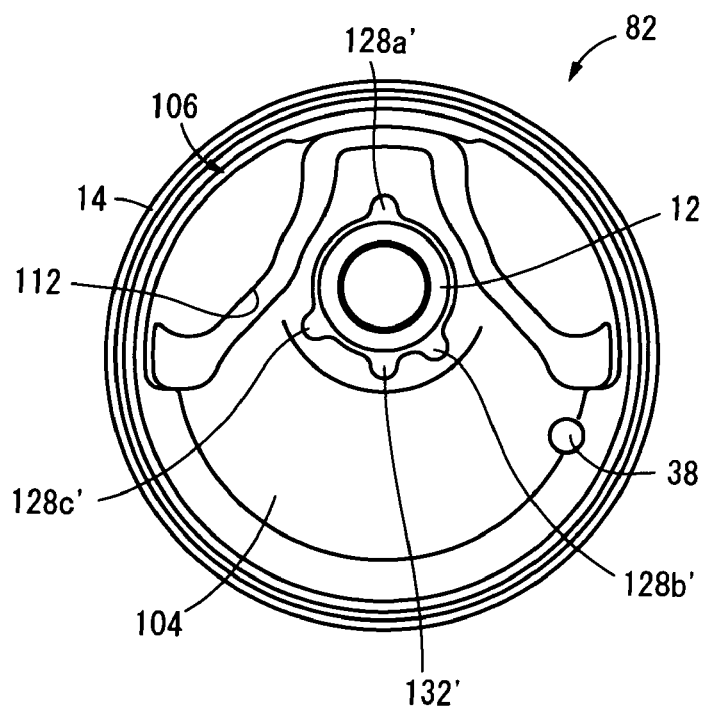
FIG. 22 is a right-side elevational view of the mount unit of FIG. 19, corresponding to FIG. 6.

As shown in FIG. 22, on the outside peripheral face of the other axial end (right in FIG. 19) in the inner sleeve 12, there are disposed three mating protrusions 128a', 128b', 128c' and a secondary protrusion 132' generally identical in shape and size to the three mating protrusions 128a, 128b, 128c and secondary protrusion 132 described previously. These three mating protrusions 128a', 128b', 128c' and secondary protrusion 132' are formed with positional relationships such that, if the shapes of the two axial end faces of the inner sleeve 12 were superimposed on one another, the protrusions would be point-symmetrical with the three mating protrusions 128a, 128b, 128c and secondary protrusion 132 at the first axial end face about the center point: $O_1$ of the inner sleeve 12.

Accordingly, the mating protrusion 128a' is situated in the generally center portion of the other axial end (right in FIG. 19) of the rebound stopper portion 90, and the distal end thereof is situated away from the lightening hole 112 by a sufficient distance in the axis-perpendicular direction. The secondary protrusion 132' is situated in opposition in the axis-perpendicular direction to the mating protrusion 128a' with the center of the inner sleeve 12 therebetween, and extends in the direction moving away from the circumferential center portion of the lightening hole 112 (downward in FIG. 22).

The mating protrusion 128b' is situated apart between the circumferential center portion and one circumferential end (left in FIG. 22) in the lightening hole 112, with the inner sleeve 12 therebetween. Thus, the distal end of the mating protrusion 128b' is disposed at a location away from the area where the lightening hole 112 is formed in the rubber elastic body 104.

The mating protrusion 128c' is situated apart between the circumferential center portion and the other circumferential end (right in FIG. 22) in the lightening hole 112, with the inner sleeve 12 therebetween, whereby the distal end of the mating protrusion 128c' is situated at a location away from the area where the lightening hole 112 is formed in the rubber elastic body 104. Accordingly, since there is no particular need to provide the notch portion 130 that, in the mating protrusion 128c of the first (left in FIG. 19) end of the inner sleeve 12, is provided for the purpose of avoiding the formation area of the lightening hole 112, no notch 130 is provided to the mating protrusion 128c'. Thus, the projecting dimension of the mating protrusion 128c' in the axis-perpendicular direction is not restricted and is generally the same as the projecting dimensions of the other two mating protrusions 128a', 128b'.

Figure 23:
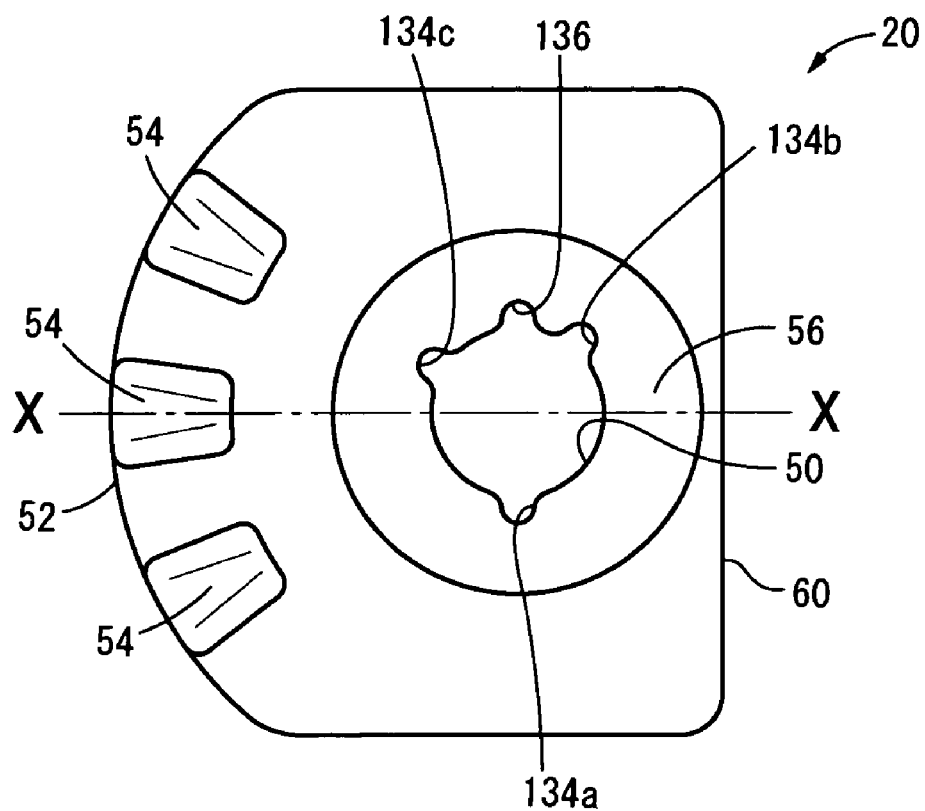
FIG. 23 is a (front/rear) side elevational view of the rubber stop plate constituting the torque roll mount of FIG. 18.
Figure 24:
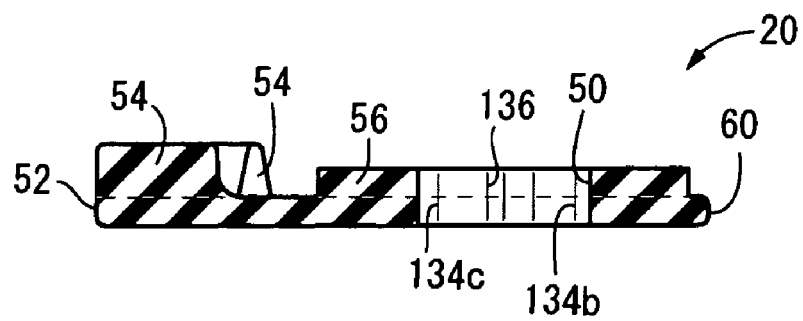
FIG. 24 is a cross sectional view of FIG. 23, corresponding to FIG. 1.
Figure 25:
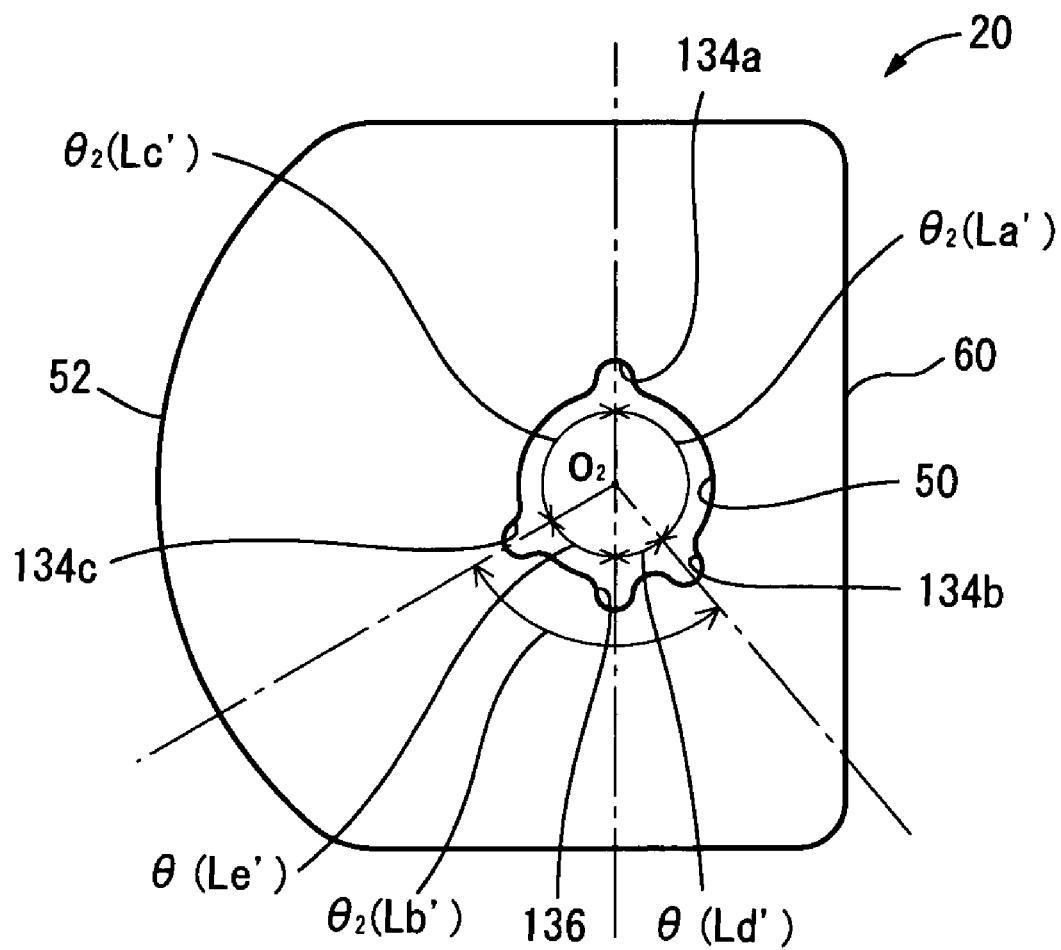
FIG. 25 is a (front/rear) side elevational view of the rubber stop plate of FIG. 23.

The mount body 82 comprising the mating protrusions 128 and secondary protrusion 132 is secured press-fit into the outer bracket 22, and a pair of rubber stop plates 20, 20 are installed on the mount body 82 as shown in FIGS. 23-25.

In particular, on the mount hole 50 of each of the rubber stop plates 20, there are formed three mating recesses 134a, 134b, 134c corresponding respectively to the three mating protrusions 128a (128a'), 128b (128b'), 128c (128c') formed on the outside peripheral face at the two axial ends of the inner sleeve 12. Additionally, at a locations corresponding to the secondary protrusion 132 (132') in each mount hole 50, namely, circumferentially between the mating protrusion 134b and mating protrusion 134c, there is formed a secondary recess 136 corresponding to the secondary protrusion 132 (132'). These mating recesses 134 and secondary recess 136 are of slightly larger shape than the mating protrusions 128 and secondary protrusion 132.

That is, as shown in FIG. 25, the angle: $θ_2$ (La') establishing the circumferential distance between the mating recess 134a and the mating recess 134b about the center point: $O_2$ of the mount hole 50 will be such that $θ_2$ (La') =150±10°, preferably $θ_2$ (La')≈140°. The angle: $θ_2$ (Lb') establishing the circumferential distance between the mating recess 134b and the mating recess 134c about the center point: $O_2$ of the mount hole 50 will be such that $O_2$ (Lb')=100±10°, preferably $O_2$ (Lb')≈100°. The angle: $θ_2$ (Lc') establishing the circumferential distance between the mating recess 134c and the mating recess 134a about the center point: $O_2$ of the mount hole 50 will be such that $θ_2$ (Lc')=120±10°, preferably $θ_2$ (Lc')≈120°. The angle: $θ_2$ (Ld') establishing the circumferential distance between the secondary recess 136 and the mating recess 134b about the center point: $O_2$ of the mount hole 50 will be such that $θ_2$ (Ld')=50±10°, preferably $θ_2$ (Ld')≈40°. The angle: $θ_2$ (Le') establishing the circumferential distance between the secondary recess 136 and the mating recess 134c about the center point: $O_2$ of the mount hole 50 will be such that $θ_2$ (Le')=50±10°, preferably $θ_2$ (Le')≈60°.

The three mating protrusions 128a, 128b, 128c formed on each end of the inner sleeve 12 are fitted into to the three mating recesses 134a, 134b, 134c of the mount hole 50 of the rubber stop plate 20, and the secondary protrusion 132 of the inner sleeve 12 is fitted into the secondary recess 136 of the mount hole 50 of the rubber stop plate 20. By so doing, on the basis of the interlocking action of the secondary protrusion 132 with the secondary recess 136, in addition to the interlocking action of the mating protrusions 128 with the mating recesses 134, relative displacement of the rubber stop plate 20 and the inner sleeve 12 in the circumferential direction is prevented.

Also, by installing the pair of rubber stop plates 20, 20 on the mount body 82, the elastic projections 54 integrally formed on the rubber stop plates 20 are positioned spaced apart by a predetermined distance from the outer sleeve 14 in the axial direction. Accordingly, in this embodiment, as in the first embodiment, by mating with the inner sleeve 12 only a rubber stop plate 20 provided with mating recesses 134a 134b, 134c and a secondary recess 136 that correspond to the three mating protrusions 128a, 128b, 128c and the secondary protrusion 132 at each end of the inner sleeve 12, the elastic projections 54 of the pair of rubber stop plates 20, 20 are positioned in opposition in the axial direction to either side of the outer sleeve 14. That is, by means of mating the mating protrusions 128 and the secondary protrusion 132 with the corresponding mating recesses 134 and secondary recess 136, the circumferential position and the front/back of the rubber stop plate 20 are identified. As will be apparent from the preceding description, in this embodiment, the secondary protrusion 132 and the secondary recess 136 function substantially as the mating protrusions 128 and mating recesses 134.

The automotive engine mount 80 of this embodiment is constituted by assembling the mount body with the pair of rubber stop plates 20, 20 installed thereon onto the inner bracket 24. The engine mount 80, oriented for example with the axial direction of the mount body 82 having the pair of rubber stop plates 20, 20 positioned in opposition thereon coincident with the vehicle front-back direction, and with the rebound stopper portion 90 of the stop member 84 positioned above the bound stopper portion 88, is installed at a suitable location between the power unit and the vehicle body in such a way that the direction of extension of the rebound stopper portion 90 and the bound stopper portion 88 is coincident with the vehicle vertical direction. The engine mount 80 is installed with the inner bracket 24 bolted to the power unit and the outer bracket bolted to the vehicle body, so that the power unit is supported in vibration-damped manner on the vehicle body.

In the engine mount 80 constructed according to this embodiment, of the plurality of mating protrusions 128 formed on the outside peripheral face of the axial end of the inner sleeve 12, the notch portion 130 is provided to the mating protrusion 128c for which there is a risk that the distal end thereof will project inwardly from the edge of the lightening hole 112, whereby the projection dimension of the mating protrusion 128c in the axis-perpendicular towards the lightening hole 112 is reduced. The other mating protrusions 128a, 128c and the secondary protrusion 132 are formed at locations away from the area where the lightening hole 112 is formed.

In the limited space between the inner sleeve 12 and the outer sleeve 14, large free surface area is assured on the part of the diaphragm formed to the outside peripheral side of the lightening hole 112, and thus sufficient capacity of the equilibrium chamber is assured, whereby the desired vibration damping action can be consistently achieved. Additionally, on the basis of mating of the secondary protrusion 132 and secondary recess 136 disposed away from the area where the lightening hole 112 is formed, in addition to mating of three pairs of mating protrusions 128 and mating recesses 134, more highly consistent installation position of the rubber stop plates is achieved.

In this embodiment, the two pairs of mating protrusions 128a, 128c and mating recesses 134b, 134c neighboring the secondary protrusion 132 and secondary recess 136 are spaced apart by relatively small distance in the circumferential direction, and the pair of mating protrusion 128a and mating recess 134a besides the two pairs of mating protrusions 128a, 128c and mating recesses 134b, 134c are spaced apart by relatively large distance in the circumferential direction. With this arrangement, in the event that, for example, it were attempted improperly to forcibly mate the secondary protrusion 132 and mating protrusions 128b, 128c spaced apart by short distances in the circumferential direction with the other mating recesses 134b, 134c, based on the fact that the pair of mating protrusions 128a spaced apart by relatively large distance in the circumferential direction will not mate with the mating recesses 134a. Thus, the front/back of the rubber stop plate 20 and the circumferential position of the rubber stop plate 20 with respect to the outer sleeve 14 can be identified with certainty, so that improper installation can be prevented more advantageously.

While presently preferred embodiments of the invention have been described in detail hereinabove, for illustrative purpose only, it is to be understood that the present invention is not limited to the details of the illustrated embodiments, but may be otherwise embodied with various other changes, modifications and improvements, which may occur to those skilled in the art, without departing from the spirit and scope of the invention defined in the following claims.

For example, in the embodiments hereinabove, the three pairs of mating protrusions 40, 128 and mating recesses 58, 134 have generally identical shape and size, but are not limited thereto. Specifically, it would be possible for height and/or width dimensions to vary among them, whereby it is possible with a greater degree of certainty to prevent forced mating during assembly, and to achieve further improvement in reliability.

Also, whereas in the embodiments hereinabove, three pairs of mating recesses 58, 134 and mating protrusions 40, 128 are employed, these specific examples should not be construed as limiting, it being sufficient merely to be able to identify circumferential position and/front back of the rubber stop plate 20 when installing in onto the inner sleeve 12, and being possible to employ mating recesses and mating protrusions of various kinds. As one example, it would be possible to identify circumferential position and front/back of the rubber stop plate by means of two mating recesses and mating protrusions of mutually different shape on the circumference.

Specifically, for example by varying the size of the circumferential width dimension of two mating recesses and mating protrusions and establishing two different circumferential intervals between them, or by varying the projecting height dimension or recess depth dimension of two mating recesses/protrusions and establishing two different circumferential intervals between them, it is possible to produce working effects analogous to those of the embodiments hereinabove.

In the embodiments hereinabove, the mating. protrusions 40, 128 are formed on the inner sleeve 12 and the mating recesses 58, 134 are formed on the rubber stop plate 20 side, but this arrangement is not limiting, it being possible instead, for example, to form the mating recesses on the inner sleeve 12, and to form the mating protrusions on the rubber stop plate 20 side, or to form the mating protrusions and mating recesses at appropriate distances apart in the circumferential direction on the inner sleeve 12 and rubber stop plate 20.

Likewise, the secondary protrusion 132 and secondary recess 136 are not limited to those described by way of example herein, and may be modified in number, shape, size, structure, location etc. as determined appropriate by the practitioner.

The mating projection 128c whose distal end is notched to restrict the extension dimension in the axis-perpendicular direction can also be modified in number, shape structure, location etc. depending on various conditions based on shape and size of the lightening hole 112, or the extent of eccentricity of the inner sleeve 12 and outer sleeve 14, such as the distance separating the mating projection 128c and the lightening hole 112.

Additionally, while in the embodiments hereinabove, the invention is described in terms of a specific example of application in a torque roll mount, the invention may be implemented in other types of engine mounts and body mounts, differential mounts, or fluid-filled vibration damping mounts of various kinds, as well as in vibration damping apparatus of non-automotive vibration damping bodies of various kinds.

What is claimed is:

1. A cylindrical vibration damping apparatus comprising:
    an inner shaft member;
    an outer cylinder member disposed spaced apart to an outside of the inner shaft member;
    a rubber elastic body disposed between and elastically connecting the inner shaft member and the outer cylinder member; and
    a pair of rubber stop plates disposed at two axial ends of the inner shaft member, each rubber stop plate having a mount hole that fits about the outside of the inner shaft member to be assembled with a corresponding axial end of the inner shaft member,
    wherein three or more pairs of mating projections and mating recesses are provided to an interface between an inner circumferential surface of the mount hole of each of the rubber stop plates and an outer circumferential surface of the corresponding axial end of the inner shaft member at different positions in a circumferential direction so that the pair of rubber stop plates are installed onto the axial ends of the inner shaft member, while correctly identifying a front and back and a circumferential position about the inner shaft members,
    wherein intervals between each of the three or more pairs of mating projections and mating recesses are different in the circumferential direction.

2. A cylindrical vibration damping apparatus according to claim 1, wherein each of the rubber stop plates has an integrally formed elastic projection projecting out from one face thereof, and with the rubber stop plate installed on the vibration damping apparatus, the elastic projection projects axially inward and is positioned in opposition to a corresponding axial end face of the outer cylindrical member.

3. A cylindrical vibration damping apparatus according to claim 1, wherein spring characteristics in an axis-perpendicular direction of the vibration damping apparatus vary along the circumferential direction, and the mating protrusions or recesses formed onto the outer circumferential surface of the inner shaft member identify a circumferential location with respect to the axis-perpendicular direction in which a particular spring characteristic is exhibited.

4. A cylindrical vibration damping apparatus according to claim 1, further comprising:
    an outer bracket of cylindrical shape having fastener legs and being pre-attached fitting onto an outside of the outer cylindrical member; and
    a differentiating member enabling differentiation of axial direction.

5. A cylindrical vibration damping apparatus according to claim 1, further comprising:
    contact members extending in an axis-perpendicular direction of the inner shaft member and being attached superposed onto the axial ends of the inner shaft member, with the rubber stop plates superposed against the contact members.

6. A cylindrical vibration damping apparatus according to claim 5, wherein the contact members disposed at the axial ends of the inner shaft member are linked together by means of a linking portion that extends in the axial direction on an outside periphery of the outer cylindrical member, to constitute an inner bracket.

7. A cylindrical vibration damping apparatus according to claim 1, further comprising:
    a lightening portion formed passing through the rubber elastic body in an axial direction, with at least one of the mating protrusions being formed on the outer circumferential surface of each of the axial ends of the inner shaft member at a circumferential location corresponding to the lightening portion, where the lightening portion is formed, the mating protrusion having an axis-perpendicular extension dimension restricted by the lightening portion so as to be smaller than other mating protrusions;
    a secondary protrusion formed on the outer circumferential surface of each of the axial ends of the inner shaft member at a location away from the area where the lightening portion is formed; and
    a secondary recess formed on the inner circumferential surface of the mount hole of the corresponding rubber stop plate, at a location corresponding to the secondary protrusion, wherein with the mating protrusions and mating recesses in a mated state, the secondary protrusion engages in the secondary recess.

8. A cylindrical vibration damping apparatus according to claim 1, wherein a lightening portion is formed extending along the circumferential direction over a generally half-circumferential portion around the inner shaft member in the rubber elastic body, and a stopper portion that projects towards the outer cylindrical member from the inner shaft member is formed between axis-perpendicular opposed faces of a circumferentially medial portion of the lightening portion and the inner shaft member.

9. A cylindrical vibration damping apparatus according to claim 7, further comprising:
    a pressure receiving chamber having a non-compressible fluid sealed therein and formed in a generally half-circumferential portion to one side of the inner shaft member in a first axis-perpendicular direction, and located inside the rubber elastic body that provides direct elastic connection between the inner shaft member and the outer cylindrical member; and
    an equilibrium chamber having the non-compressible fluid sealed therein and formed in a generally half-circumferential portion to an other side of the inner shaft member where the lightening portion is formed, and located inside the rubber elastic body that is situated to an outside periphery of the lightening portion so as to substantially avoids stress transmission from the inner shaft member.

10. A cylindrical vibration damping apparatus according to claim 1, wherein the mating recesses and mating protrusions are formed as three pairs having relative positional relationships of 90±10°, 120±10°, and 150±10° in the circumferential direction.

11. A method of manufacturing a cylindrical vibration damping apparatus, comprising the steps of:

preparing a cylindrical vibration damping unit by disposing an outer cylindrical member spaced apart to an outside of an inner shaft member, and connecting the inner shaft member and the outer cylindrical member by means of a rubber elastic body, while providing three or more mating projections or three or more mating recesses on outer circumferential surfaces of two axial ends of the inner shaft member at different positions in a circumferential direction, intervals between each of the three or more pairs of mating projections or mating recesses being different in the circumferential direction;

while identifying axial direction of the vibration damping unit, press fitting the outer cylindrical member of the vibration damping unit into a cylindrical outer bracket having fastener legs, to attach the outer bracket to the vibration damping unit;

preparing a pair of rubber stop plates each having generally flat plate shape and having a mount hole formed in a center portion, there being formed on an inner circumferential surface of the mount hole mating protrusions or mating recesses at a location on the circumference corresponding to the mating recess or mating protrusion formed on the outer circumferential surface of a corresponding axial end of the inner shaft member; and installing the pair of rubber stop plates with the mount holes thereof fitting onto the two axial ends of the inner shaft member in the vibration damping unit to which the outer bracket has been attached, and mating the mating protrusions or mating recesses of each of the rubber stop plates with the mating recesses or mating protrusions on the inner shaft member, in order to attach the pair of rubber stop plates to the inner shaft member while identifying the front and back thereof and while identifying the circumferential direction position around the inner shaft member.

12. A method of manufacturing a cylindrical vibration damping apparatus according to claim 11, further comprising, in the step of attaching the outer bracket to the vibration damping unit, steps of:

aligning the vibration damping unit relative to the outer bracket; and then press fitting the vibration damping unit into the outer bracket.

* * * * *